(12) United States Patent
Tashiro et al.

(10) Patent No.: US 8,970,967 B2
(45) Date of Patent: Mar. 3, 2015

(54) ZOOM LENS, IMAGE-PICKUP APPARATUS HAVING THE SAME, AND IMAGE PROJECTION APPARATUS HAVING THE SAME

(71) Applicant: Canon Kabushiki Kaisha, Tokyo (JP)

(72) Inventors: Yoshihisa Tashiro, Nikko (JP); Norihito Hiasa, Utsunomiya (JP)

(73) Assignee: Canon Kabushiki Kaisha (JP)

(*) Notice: Subject to any disclaimer, the term of this patent is extended or adjusted under 35 U.S.C. 154(b) by 0 days.

(21) Appl. No.: 14/031,718

(22) Filed: Sep. 19, 2013

(65) Prior Publication Data

US 2014/0085513 A1 Mar. 27, 2014

(30) Foreign Application Priority Data

Sep. 21, 2012 (JP) ................................ 2012-207970

(51) Int. Cl.
  *G02B 15/14* (2006.01)
  *H04N 5/232* (2006.01)
  *G02B 13/18* (2006.01)
  *G02B 15/177* (2006.01)

(52) U.S. Cl.
  CPC ............ *G02B 15/14* (2013.01); *H04N 5/23296* (2013.01); *G02B 13/18* (2013.01); *G02B 15/177* (2013.01)
  USPC .......................................... 359/682; 359/680

(58) Field of Classification Search
  CPC ...... G02B 15/177; G02B 15/14; G02B 13/18; H04N 5/23296
  USPC ................ 348/240.3; 359/680, 681, 682, 683
  See application file for complete search history.

(56) References Cited

U.S. PATENT DOCUMENTS

| | | | |
|---|---|---|---|
| 7,480,102 B2 | 1/2009 | Yokoyama | |
| 8,654,451 B2* | 2/2014 | Kunugise | 359/691 |
| 8,665,528 B2* | 3/2014 | Yuki | 359/680 |
| 8,670,184 B2* | 3/2014 | Eguchi | 359/682 |
| 2012/0162768 A1* | 6/2012 | Kuzuhara et al. | 359/557 |

FOREIGN PATENT DOCUMENTS

| JP | 2007-264600 A | 10/2007 |
|---|---|---|
| JP | 2008-158159 A | 7/2008 |

* cited by examiner

*Primary Examiner* — David N Spector
(74) *Attorney, Agent, or Firm* — Rossi, Kimms & McDowell LLP

(57) ABSTRACT

The zoom lens includes, in order from an object side to an image side, a first lens unit having a negative refractive power, a rear unit including one or more lens units, a distance between every adjacent lens units varies during zooming, and an aperture diaphragm on the image side of the first lens unit, a combined focal length of the rear unit at a wide-angle end being positive. One lens unit LG on the object side of the aperture diaphragm is made of a solid material, and includes an optical element GnNL having a negative refractive power and another optical element having a positive refractive power, and the predetermined conditions are satisfied.

17 Claims, 15 Drawing Sheets

ZOOM LENS, IMAGE-PICKUP APPARATUS HAVING THE SAME, AND IMAGE PROJECTION APPARATUS HAVING THE SAME

BACKGROUND OF THE INVENTION

1. Field of the Invention

The present invention is suitable for an image-pickup optical system, for example, for a digital camera, a video camera, a film-based camera, a TV camera, and the like, and for a projection optical system for a projector.

2. Description of the Related Art

An image-pickup optical system for a digital camera and a projection optical system for a liquid crystal projector are required to have a wide angle of view, a high zoom ratio, and a high optical performance in the entire zoom range. As a zoom lens which can easily widen an angle of view, a negative-lead type zoom lens is known which includes a first lens unit that is arranged closest to the object and has a negative refractive power.

As the angle of view is widened in the negative-lead type zoom lens, the secondary (spectrum of the) lateral chromatic aberration increases at the wide-angle end. As the zoom ratio is enlarged with widening the angle of view, the secondary spectra of the lateral chromatic aberrations increase both at the wide-angle end and the telephoto end. At this time, the secondary spectra of the lateral chromatic aberrations occur at the wide-angle end and the telephoto end in opposite directions, and it becomes difficult to correct them in a well-balanced manner.

In the conventional negative-lead type zoom lens, the chromatic aberration is corrected by using an optical material with a high dispersion and a high anomalous partial dispersion.

U.S. Pat. No. 7,480,102 B2 discloses a zoom lens in which a material with a high dispersion and a high anomalous partial dispersion is used respectively for a lens unit disposed on the object side of the aperture diaphragm, and for a movable lens unit on the image-side lens unit so as to reduce a variation of a chromatic aberration during the zooming.

Japanese Patent Laid-open No. 2008-158159 discloses a zoom lens in which a lens made of a material with a high dispersion and a high anomalous partial dispersion is used for a first lens unit on the object side so as to reduce the chromatic aberration.

SUMMARY OF THE INVENTION

The present invention provides a zoom lens with a high zoom ratio and a wide angle of view, which can easily and properly correct the lateral chromatic aberration.

A zoom lens according to the present invention includes, in order from an object side to an image side, a first lens unit having a negative refractive power, a rear unit including one or more lens units, a distance between every adjacent lens units varies during zooming, and an aperture diaphragm disposed on the image side of the first lens unit, a combined focal length of the rear unit at a wide-angle end being positive. One lens unit LG on the object side of the aperture diaphragm includes an optical element GnNL made of a solid material having a negative refractive power and another optical element made of a solid material having a positive refractive power. The following conditional expressions are satisfied:

$$0.0 < \theta gFnNL - (-1.7 \times 10^{-7} \times vdnNL^3 + 5.3 \times 10^{-5} \times vdnNL^2 - 5.7 \times 10^{-3} \times vdnNL + 0.76) < 0.4; \text{ and}$$

$$6.5 \times 10^{-4} < ((\theta gFnNL - \theta gFpNL)/vdnNL) \times |fG/fnNL| < 5.0 \times 10^{-3},$$

where vdnNL is an Abbe number of a material of the optical element GnNL, θgFnNL is a partial dispersion ratio of the material of the optical element GnNL, θgFpNL is a partial dispersion ratio of a material of an optical element GpNL having a positive refractive power, the material of the optical element GpNL has a maximum partial dispersion ratio among materials of positive lenses included in the lens unit LG, fnNL is a focal length of the optical element GnNL in air, and fG is a focal length of the lens unit LG.

Further features of the present invention will become apparent from the following description of exemplary embodiments with reference to the attached drawings.

DESCRIPTION OF THE EMBODIMENTS

A description will now be given of embodiments of the present invention with reference to the accompanying drawings. The zoom lens according to the present invention includes, in order from an object side to an image side, a first lens unit having a negative refractive power, and a rear unit including one or more lens units. A distance between every adjacent lens units changes during zooming. The zoom lens further includes an aperture diaphragm at an image side of the first lens unit. A combined focal length of the rear unit at the wide-angle end is positive.

Figure 1:
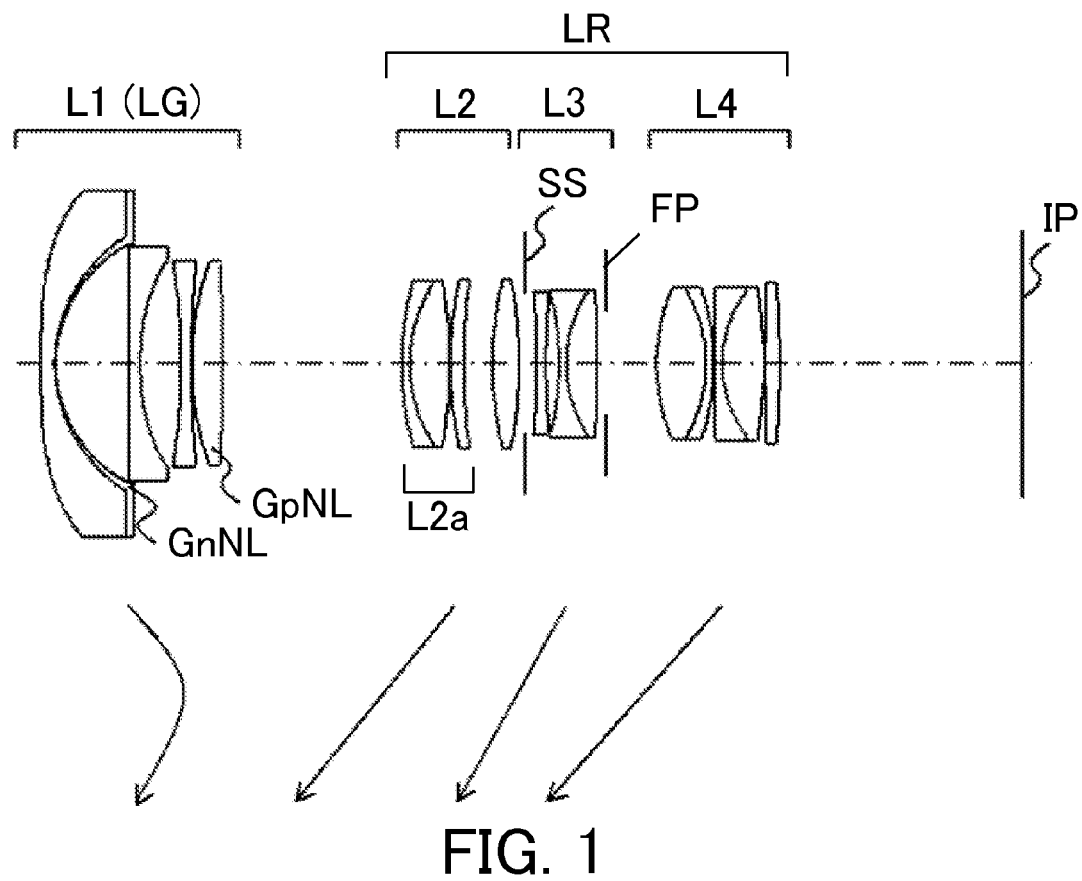
FIG. 1 is a lens sectional view at a wide-angle end according to a first embodiment.
Figure 2A:
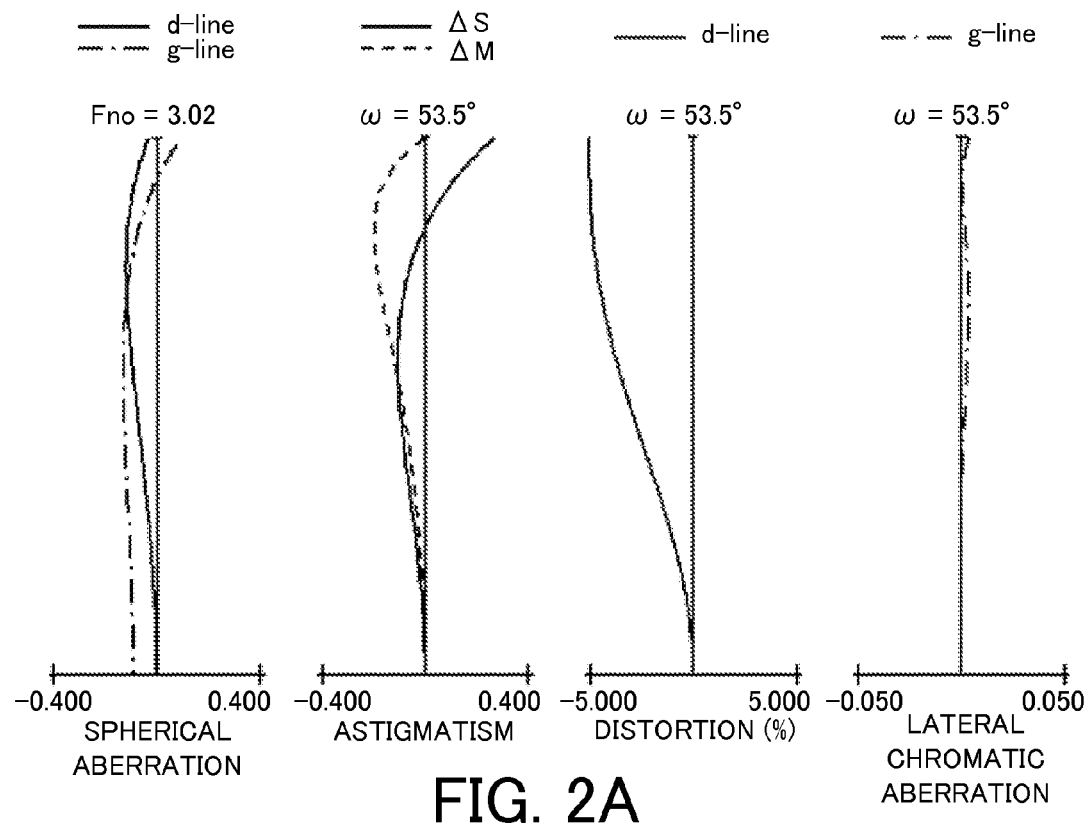
FIGS. 2A, 2B, and 2C are aberrational diagrams respectively at the wide-angle end, an intermediate zoom position, and a telephoto end according to the first embodiment.
Figure 2B:
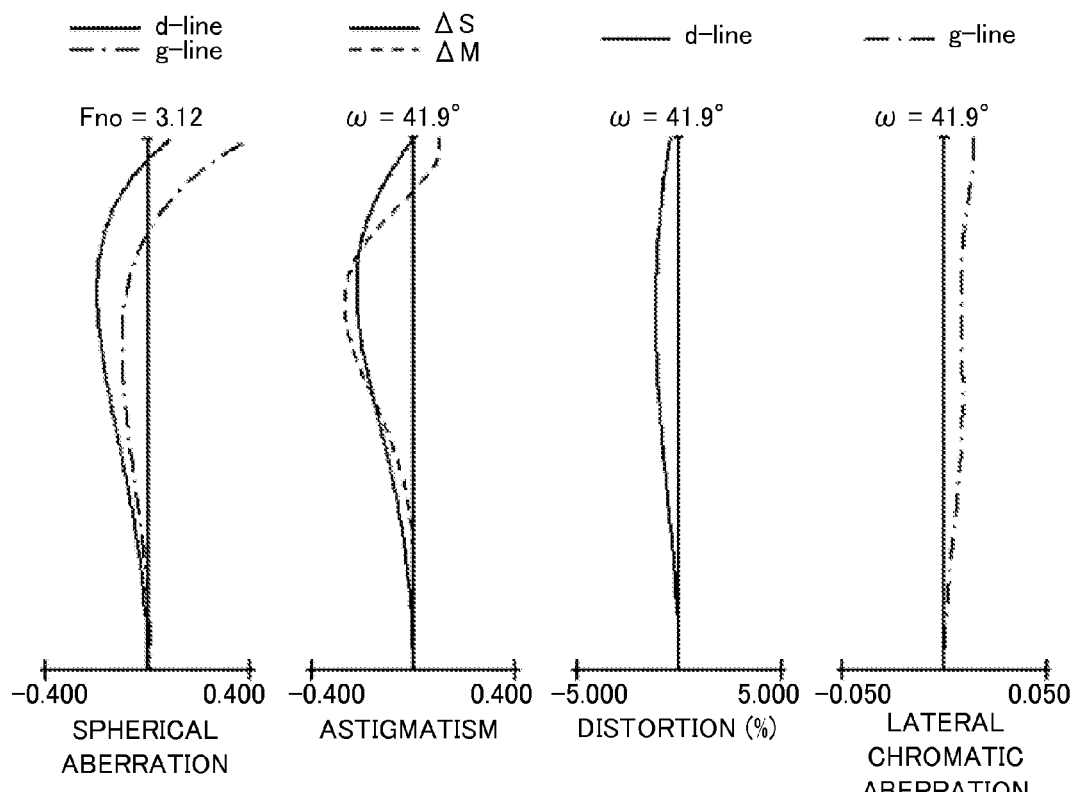
Figure 2C:
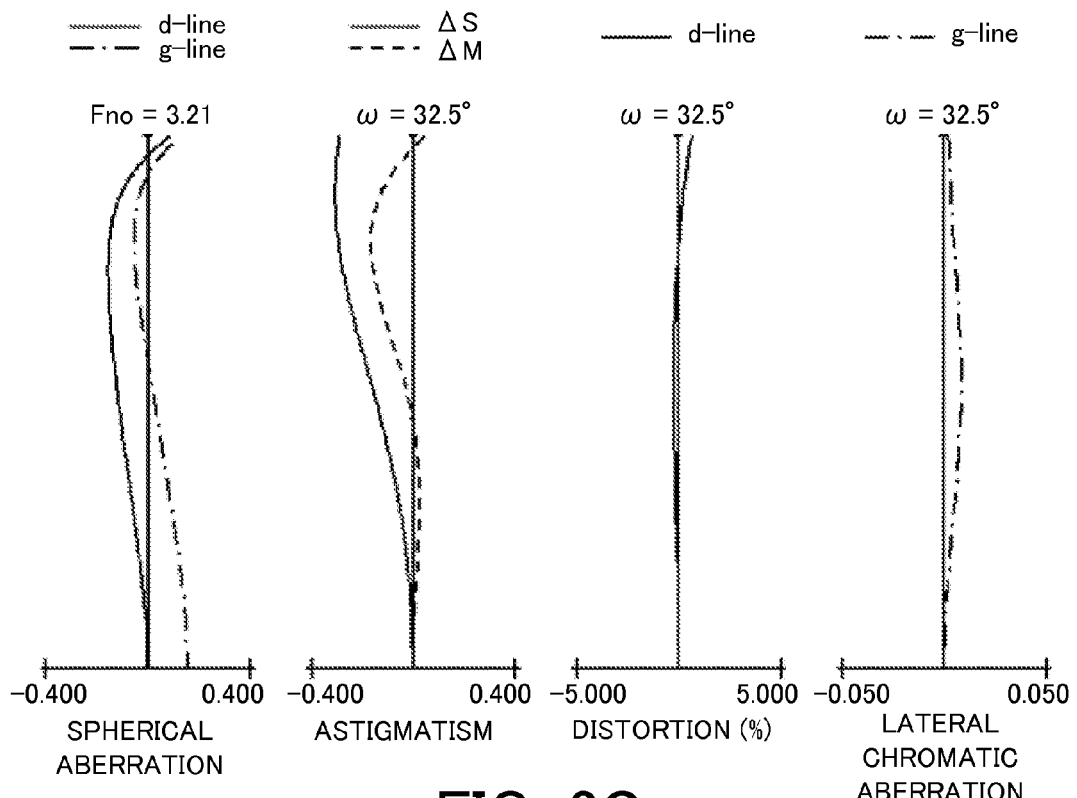
Figure 3:
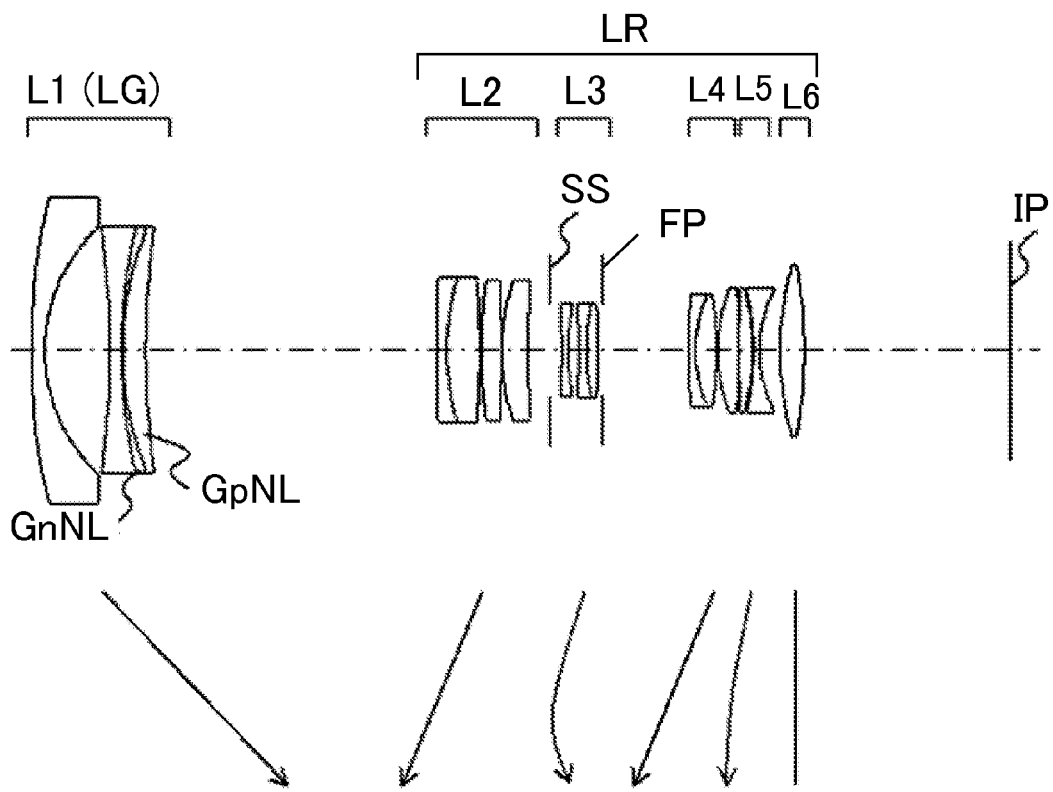
FIG. 3 is a lens sectional view at a wide-angle end according to a second embodiment.
Figure 4A:
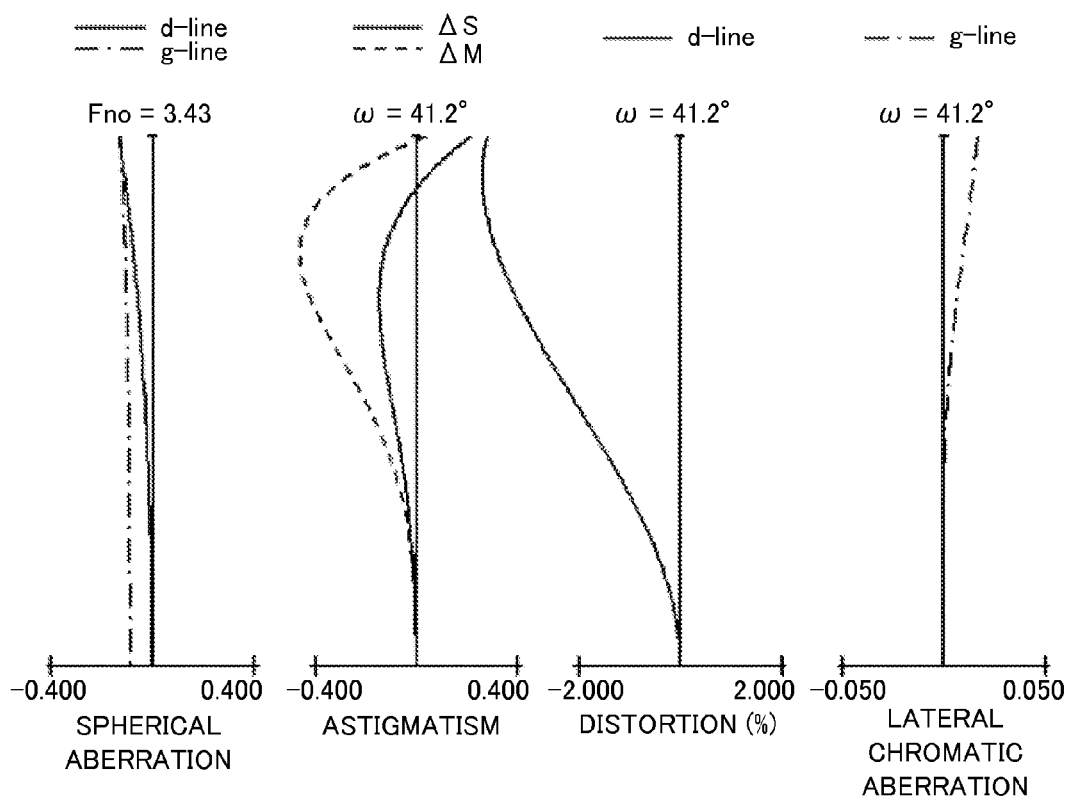
FIGS. 4A, 4B, and 4C are aberrational diagrams respectively at the wide-angle end, an intermediate zoom position, and a telephoto end according to the second embodiment.
Figure 4B:
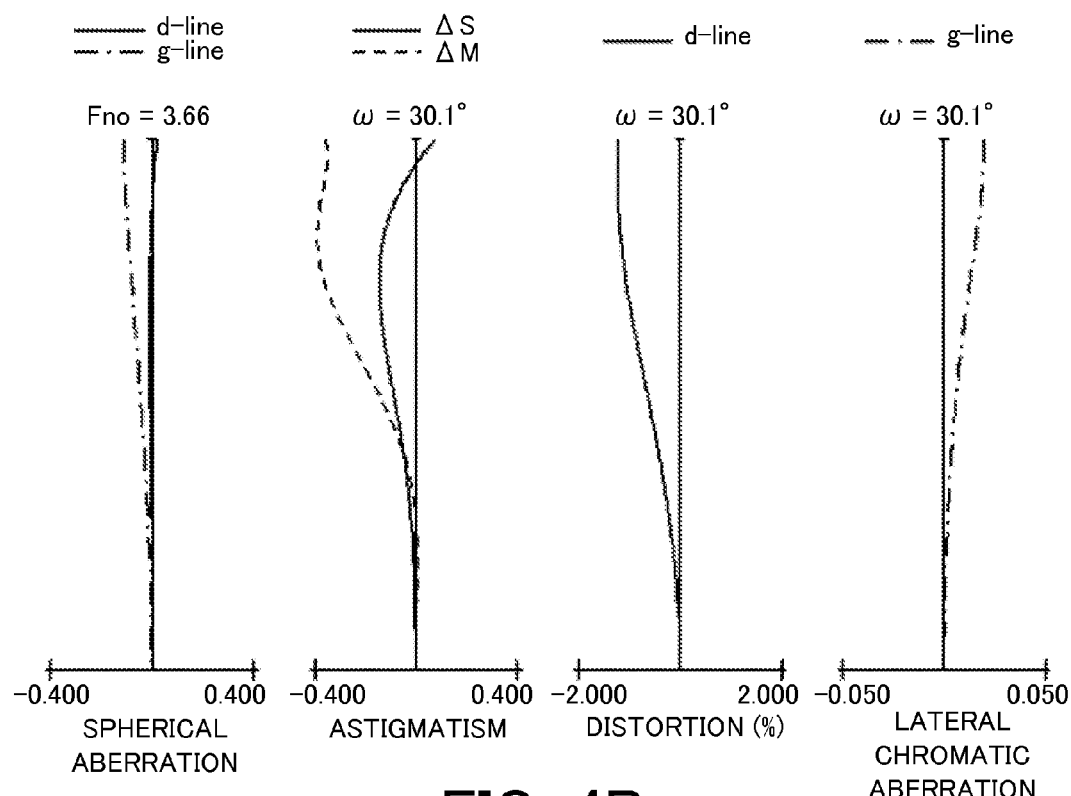
Figure 4C:
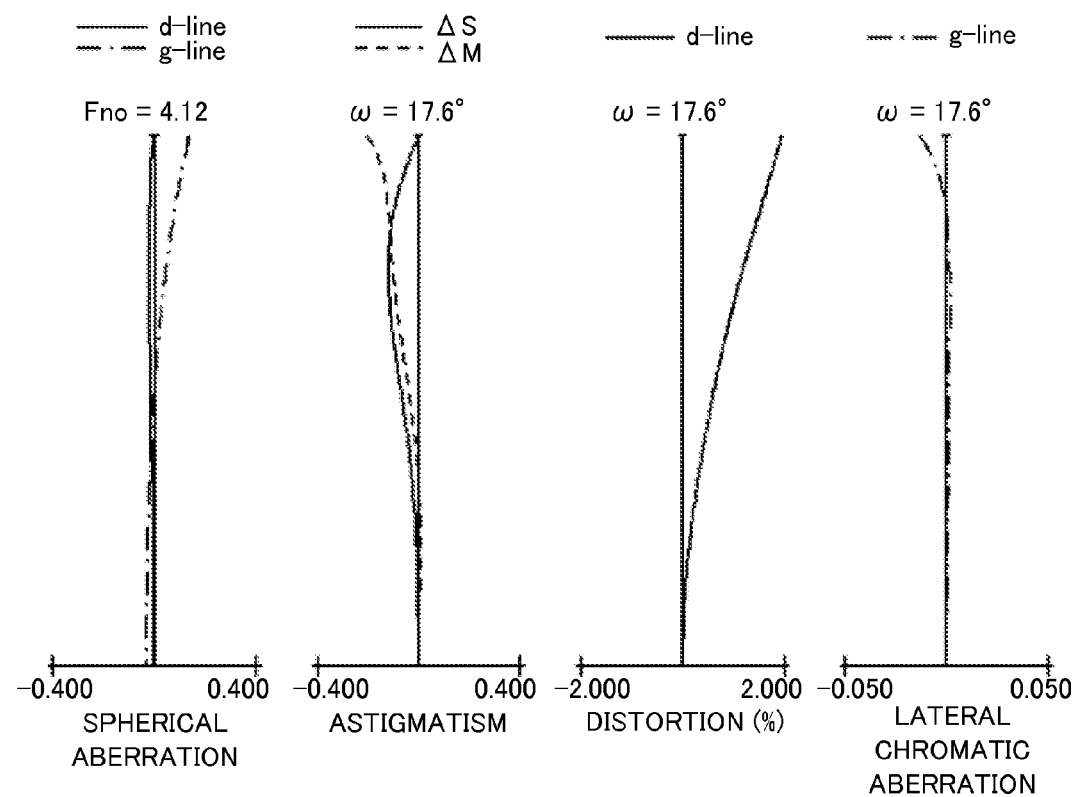

FIG. 1 is a sectional view at a wide-angle end (a short focal length end) of the zoom lens according to a first embodiment of the present invention. FIGS. 2A, 2B, and 2C are aberrational diagrams respectively at the wide-angle end, an intermediate zoom position, and a telephoto end (a long focal length end) according to the first embodiment. FIG. 3 is a sectional view at a wide-angle end of the zoom lens according to a second embodiment of the present invention. FIGS. 4A, 4B, and 4C are aberrational diagrams respectively at the wide-angle end, an intermediate zoom position, and a telephoto end according to the second embodiment.

Figure 5:
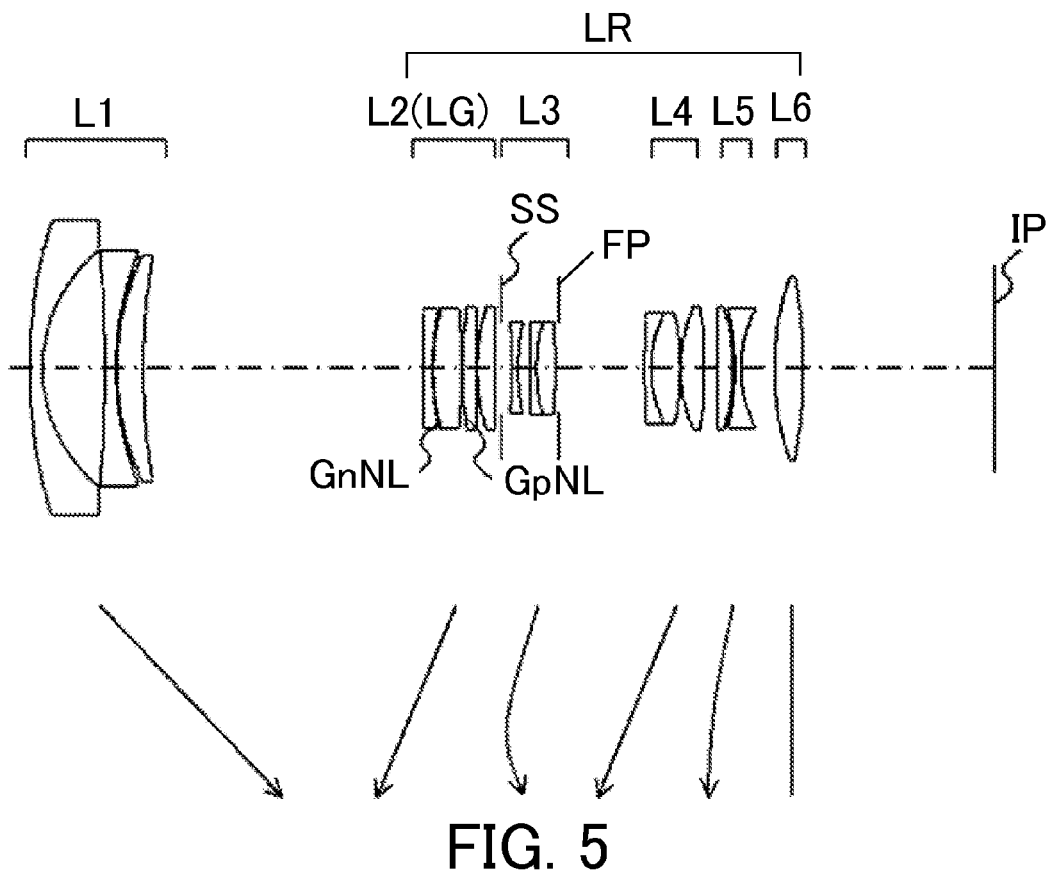
FIG. 5 is a lens sectional view at a wide-angle end according to a third embodiment.
Figure 6A:
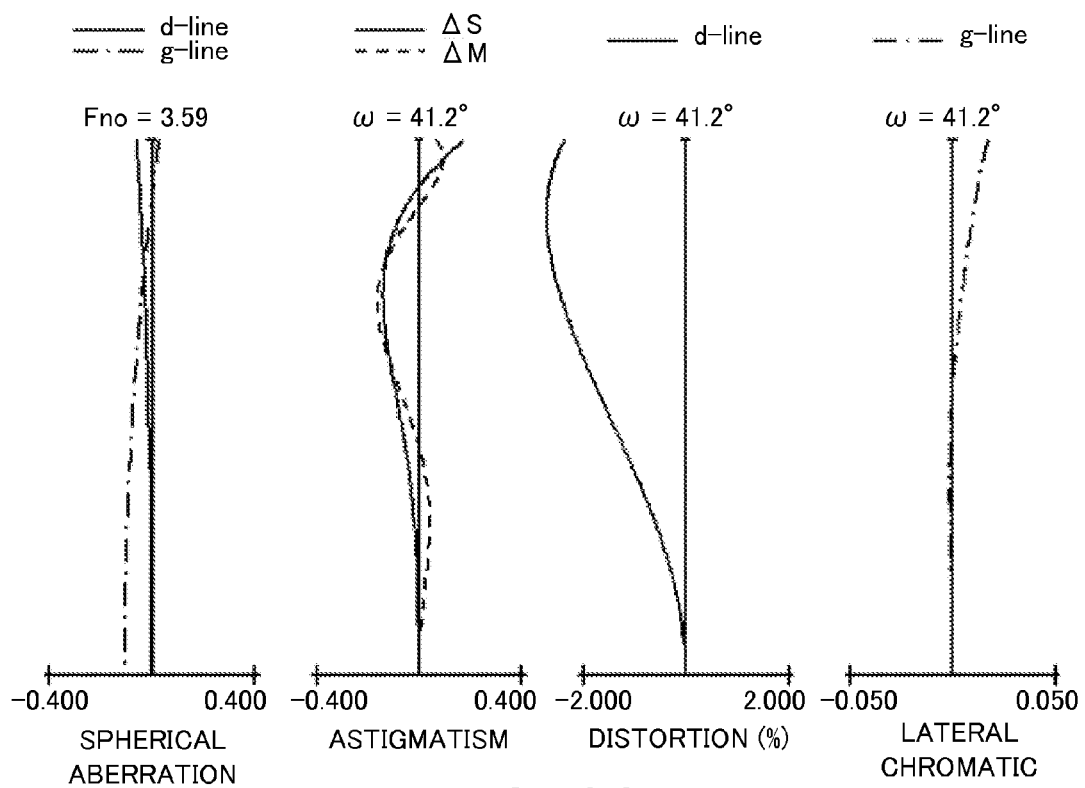
FIGS. 6A, 6B, and 6C are aberrational diagrams respectively at the wide-angle end, an intermediate zoom position, and a telephoto end according to the third embodiment.
Figure 6B:
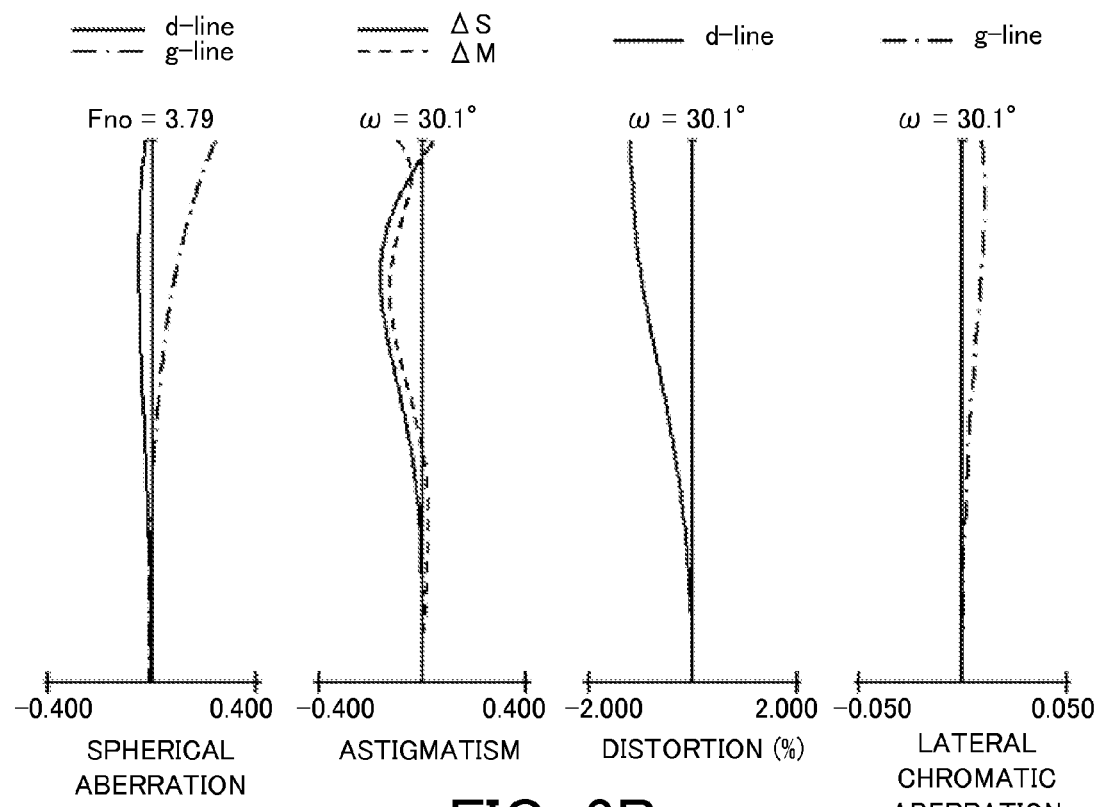
Figure 6C:
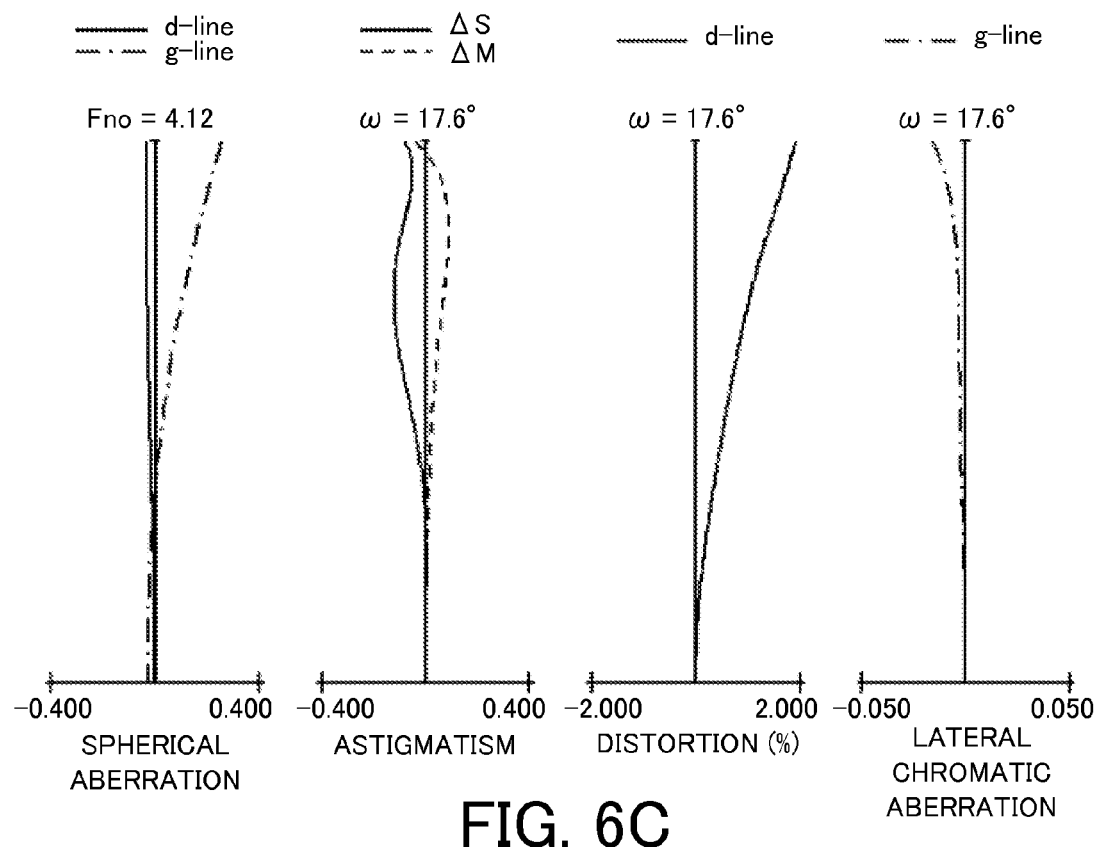
Figure 7:
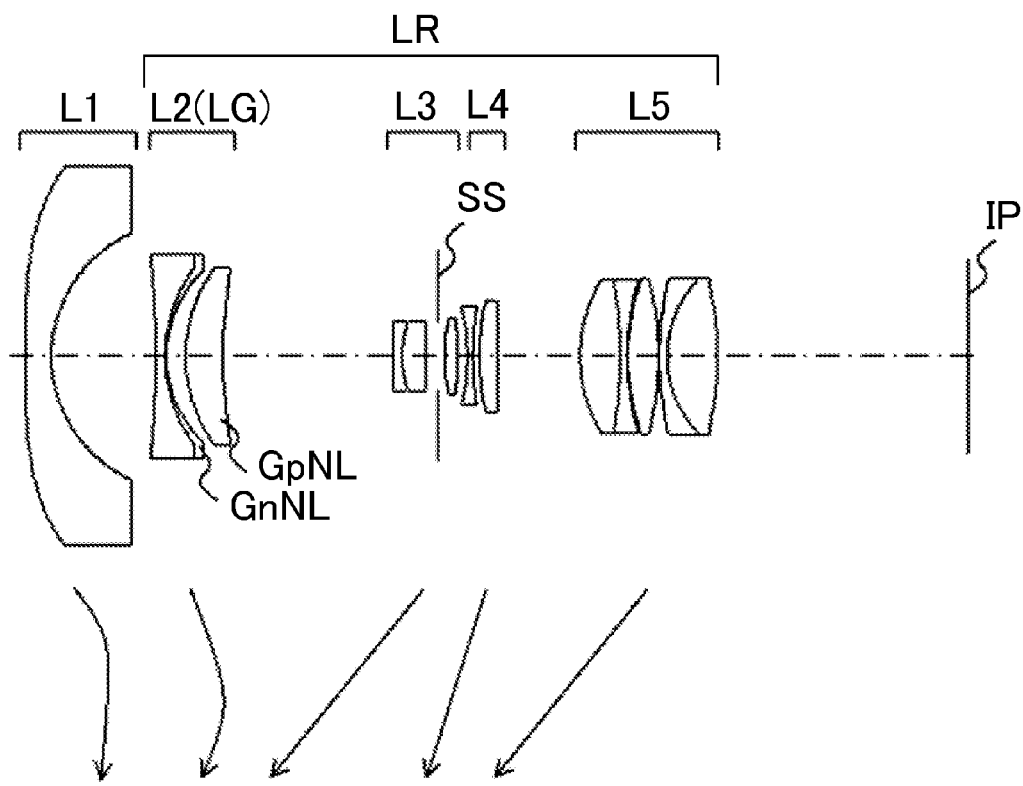
FIG. 7 is a lens sectional view at a wide-angle end according to a fourth embodiment.
Figure 8A:
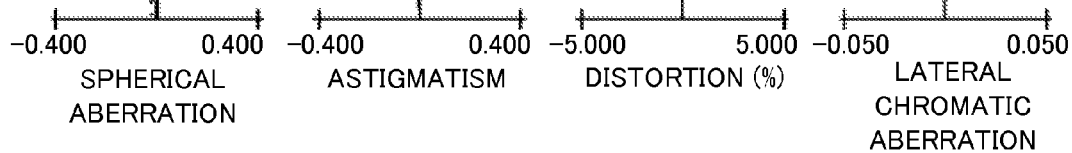
FIGS. 8A, 8B, and 8C are aberrational diagrams respectively at the wide-angle end, an intermediate zoom position, and a telephoto end according to the fourth embodiment.
Figure 8B:
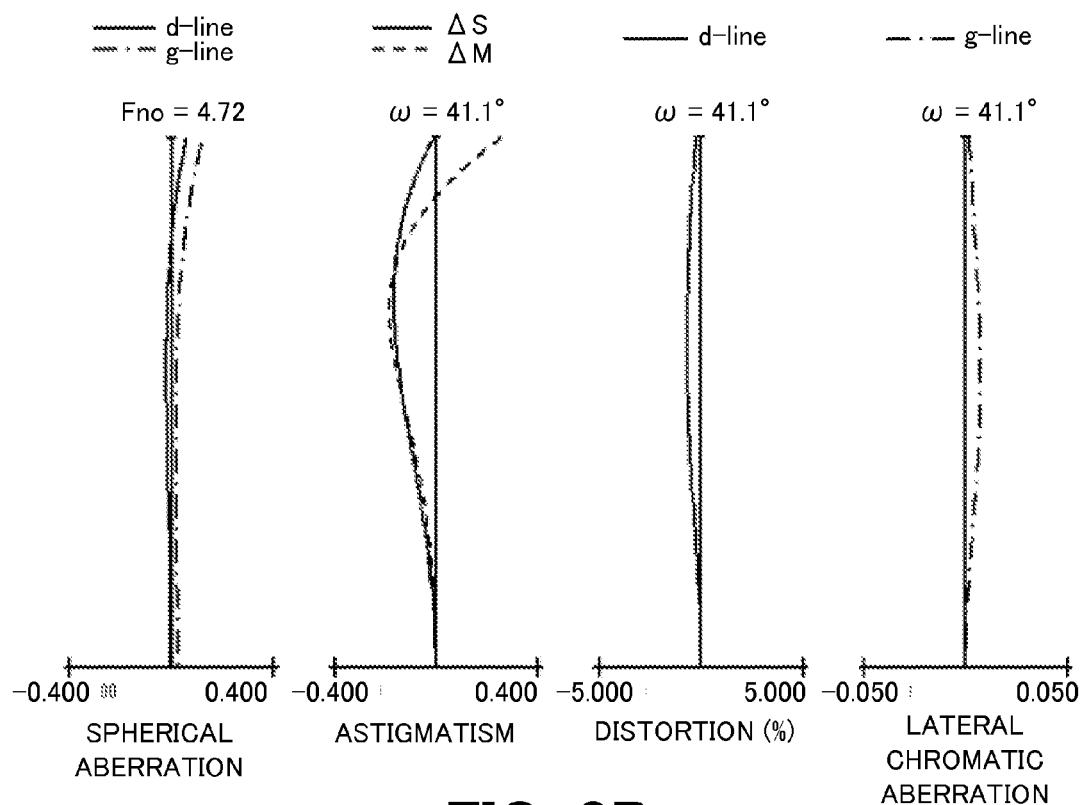
Figure 8C:
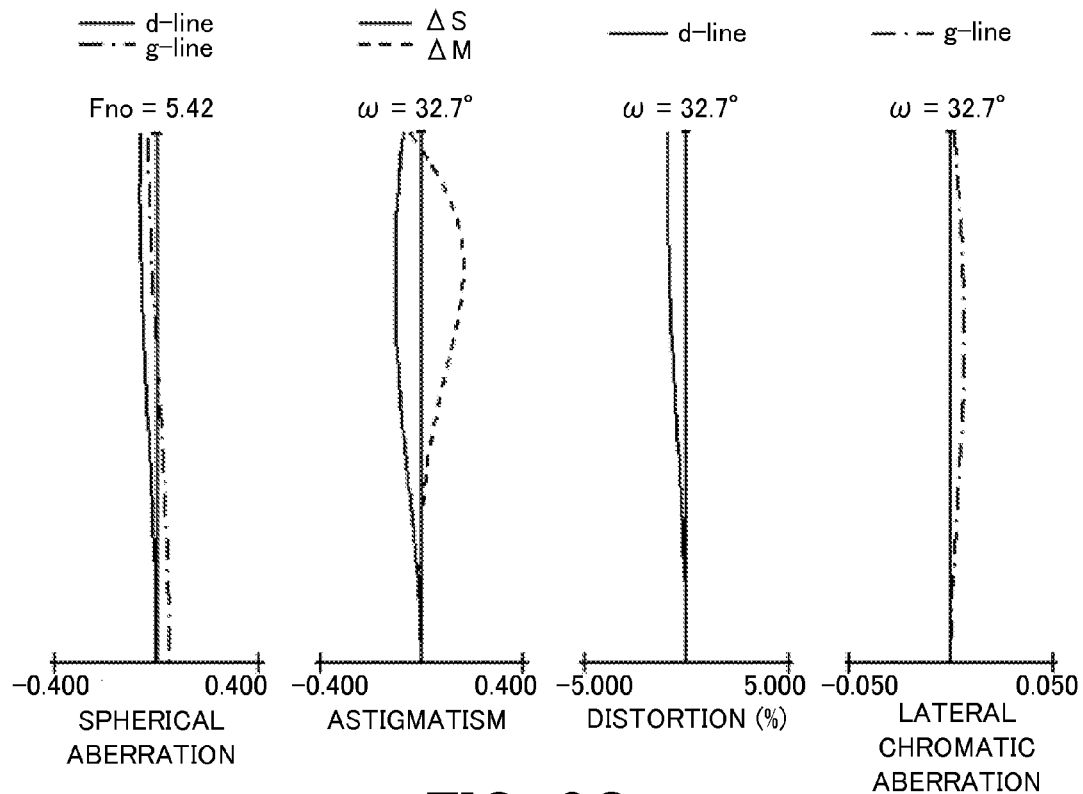

FIG. 5 is a sectional view at a wide-angle end of the zoom lens according to a third embodiment of the present invention. FIGS. 6A, 6B, and 6C are aberrational diagrams respectively at the wide-angle end, an intermediate zoom position, and a telephoto end, of third embodiment. FIG. 7 is a sectional view at a wide-angle end of the zoom lens according to a fourth embodiment of the present invention. FIGS. 8A, 8B, and 8C are aberrational diagrams respectively at the wide-angle end, an intermediate zoom position, and a telephoto end according to the fourth embodiment.

Figure 9:
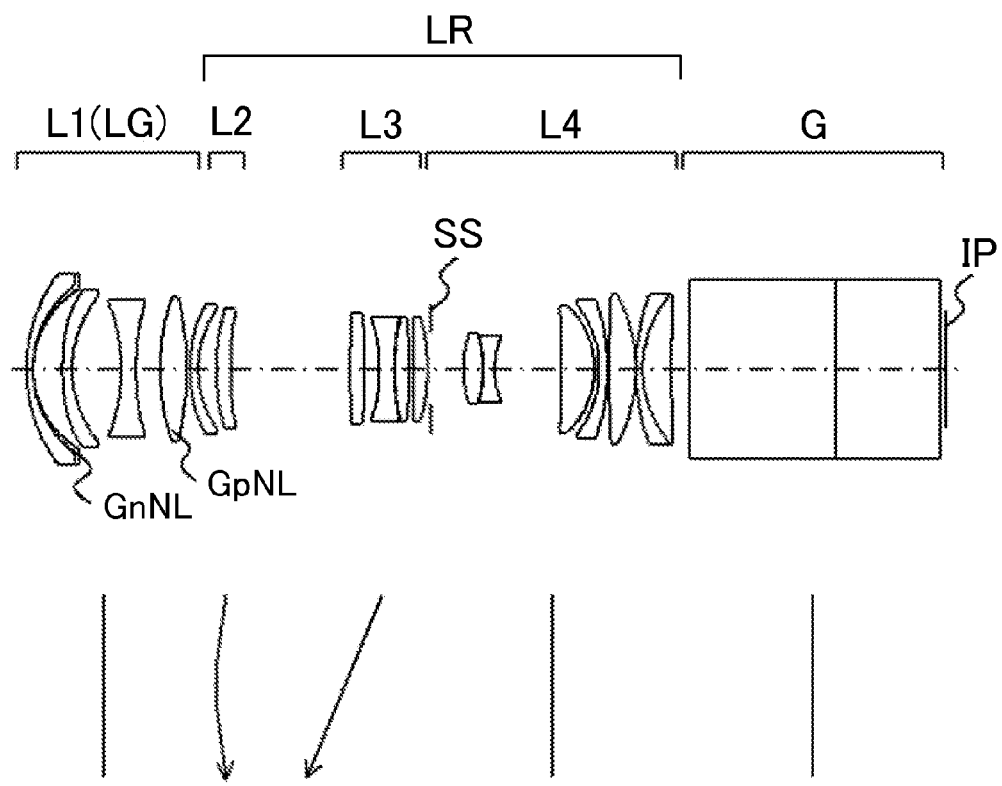
FIG. 9 is a lens sectional view at a wide-angle end according to a fifth embodiment.
Figure 10A:
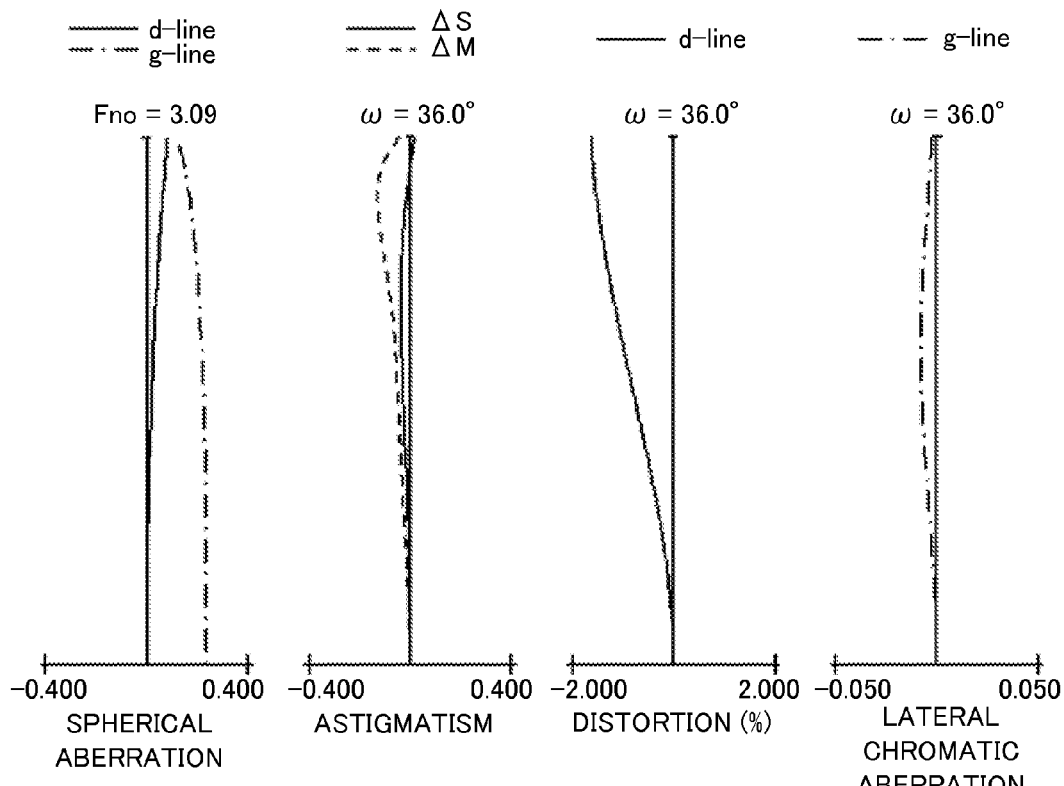
FIGS. 10A, 10B, and 10C are aberrational diagrams respectively at the wide-angle end, an intermediate zoom position, and a telephoto end according to the fifth embodiment.
Figure 10B:
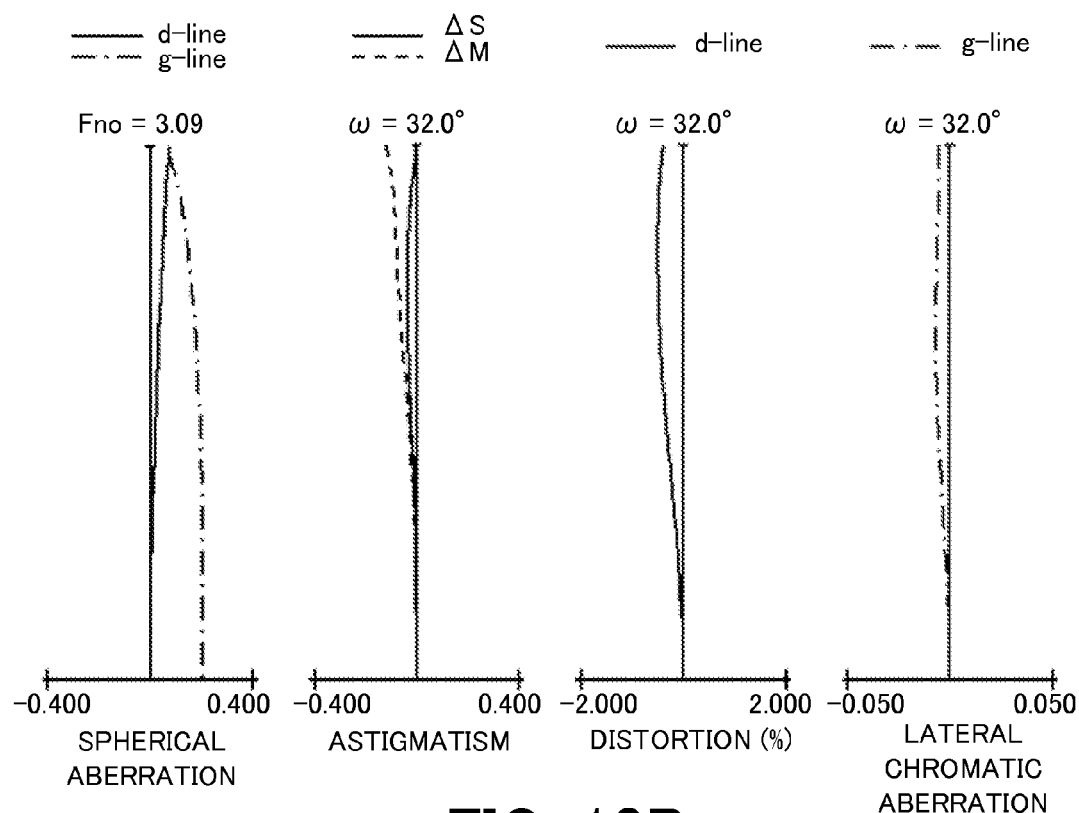
Figure 10C:
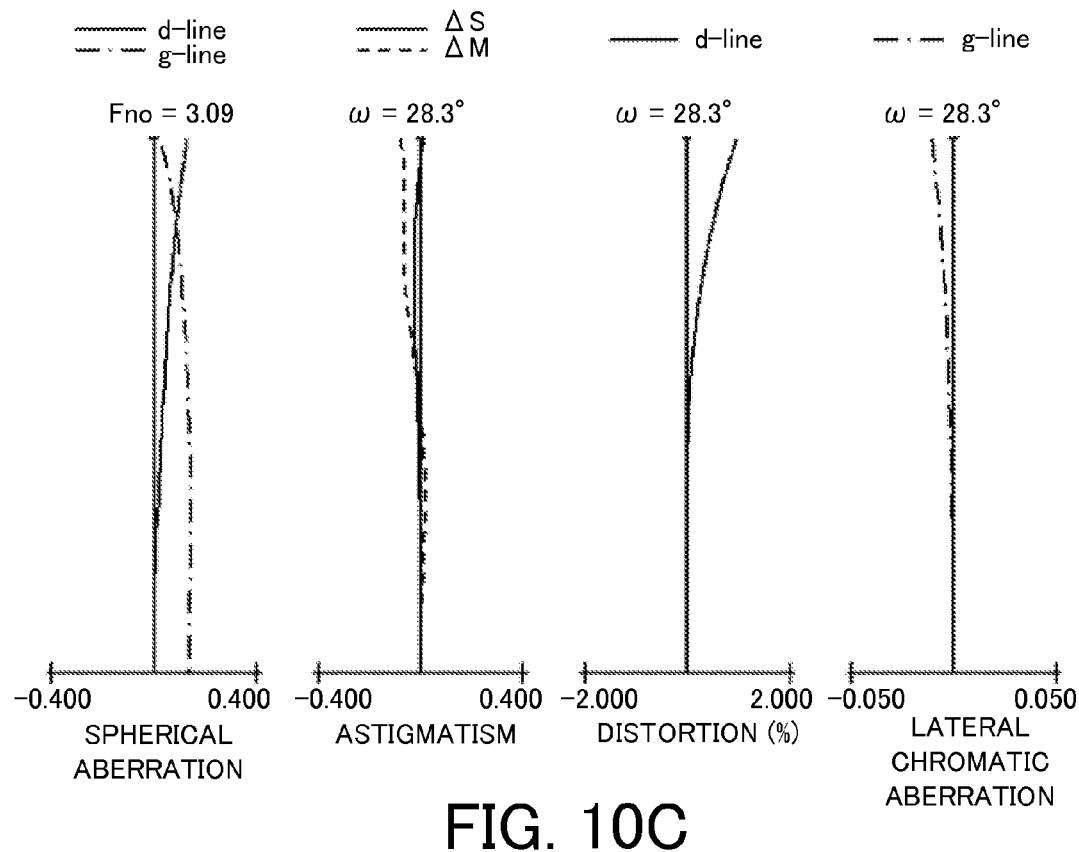
Figure 11:
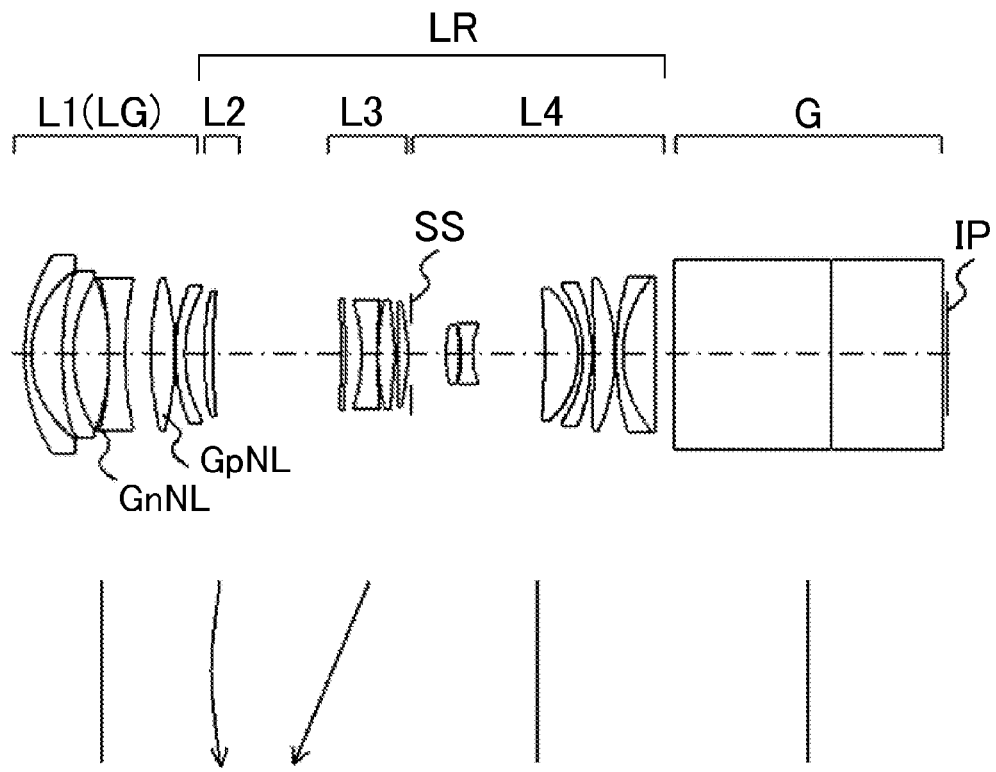
FIG. 11 is a lens sectional view at a wide-angle end according to a sixth embodiment.
Figure 12A:
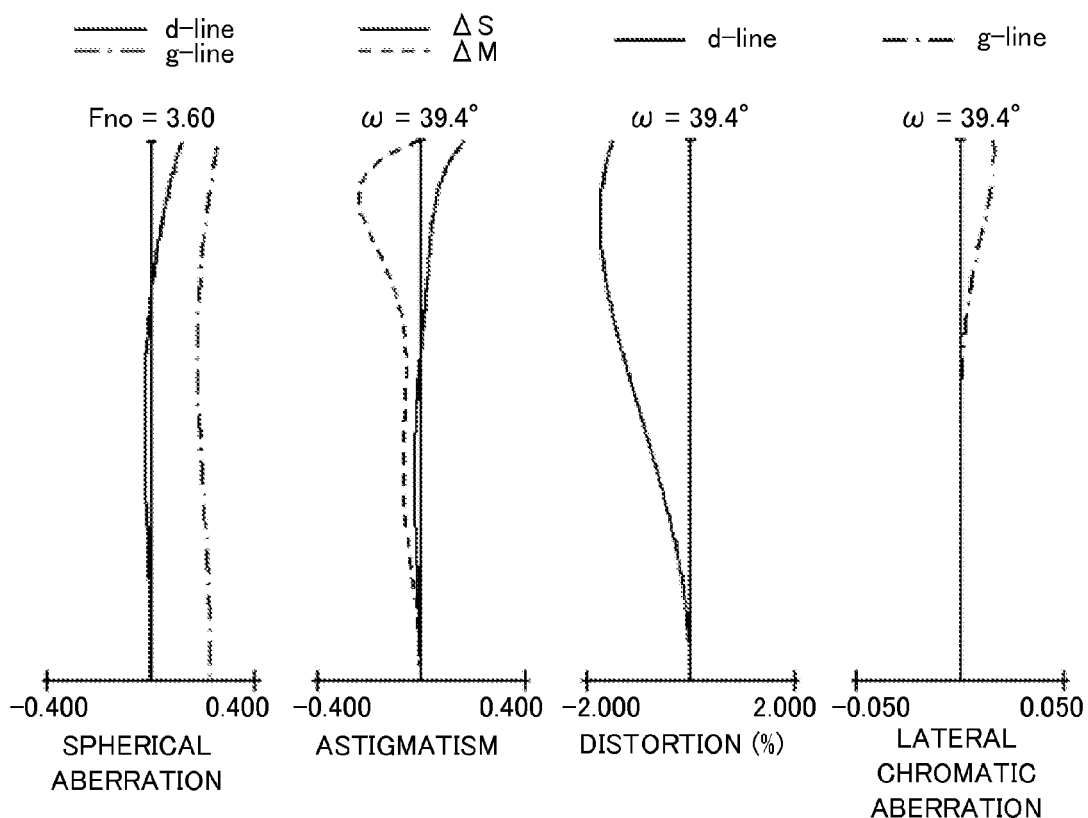
FIGS. 12A, 12B, and 12C are aberrational diagrams respectively at the wide-angle end, an intermediate zoom position, and a telephoto end according to the sixth embodiment.
Figure 12B:
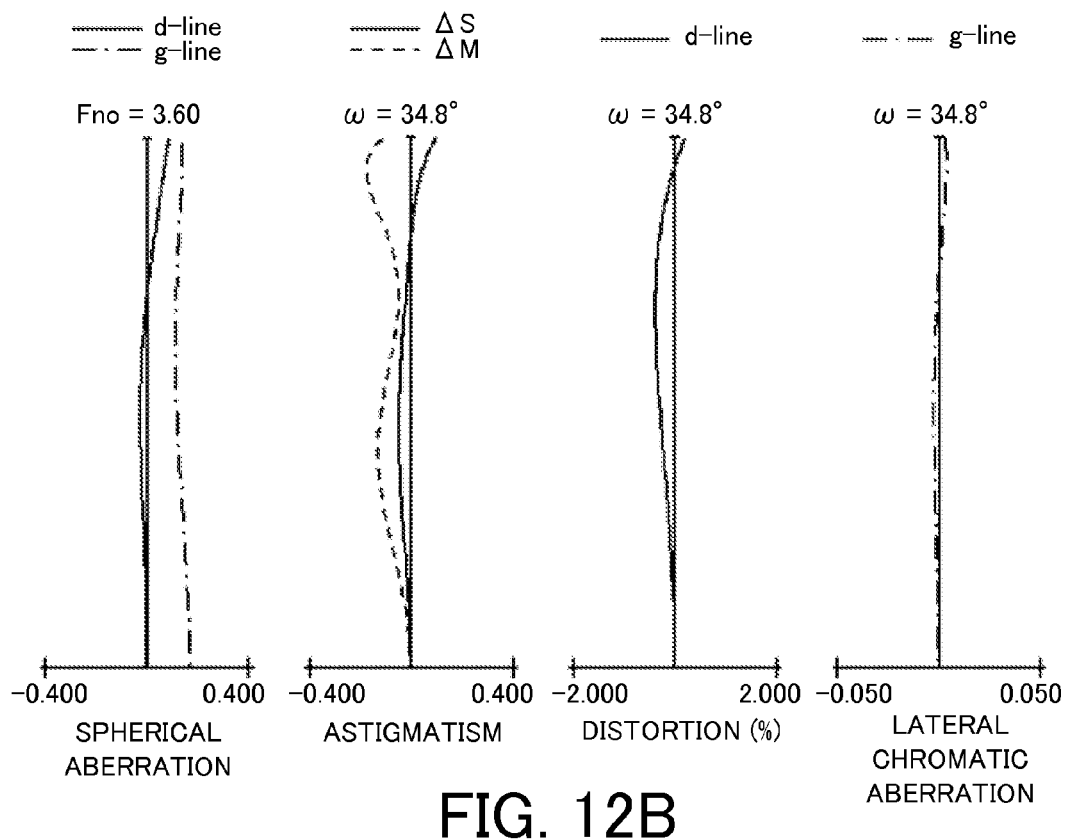
Figure 12C:
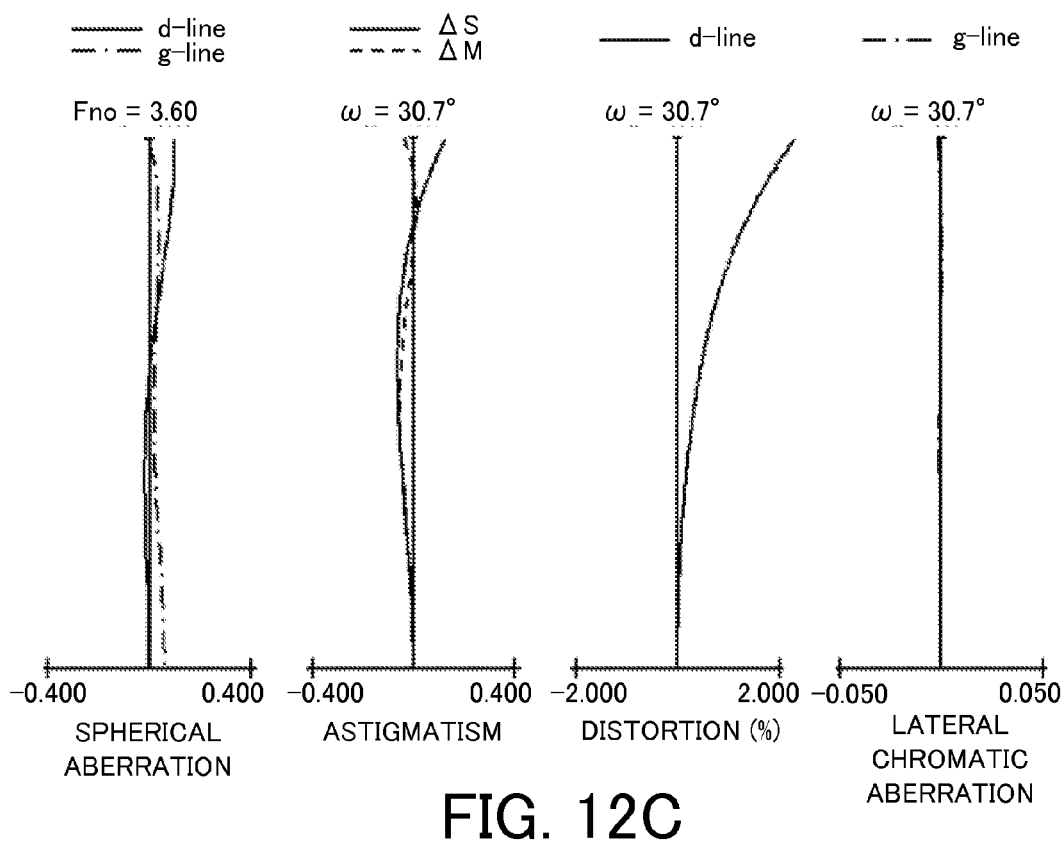

FIG. 9 is a sectional view at a wide-angle end of the zoom lens according to a fifth embodiment of the present invention. FIGS. 10A, 10B, and 10C are aberrational diagrams respectively at the wide-angle end, an intermediate zoom position, and a telephoto end, according to the fifth embodiment. FIG. 11 is a sectional view at a wide-angle end of the zoom lens according to a sixth embodiment of the present invention. FIGS. 12A, 12B, and 12C are aberrational diagrams respectively at the wide-angle end, an intermediate zoom position, and a telephoto end according to the sixth embodiment.

Figure 13:
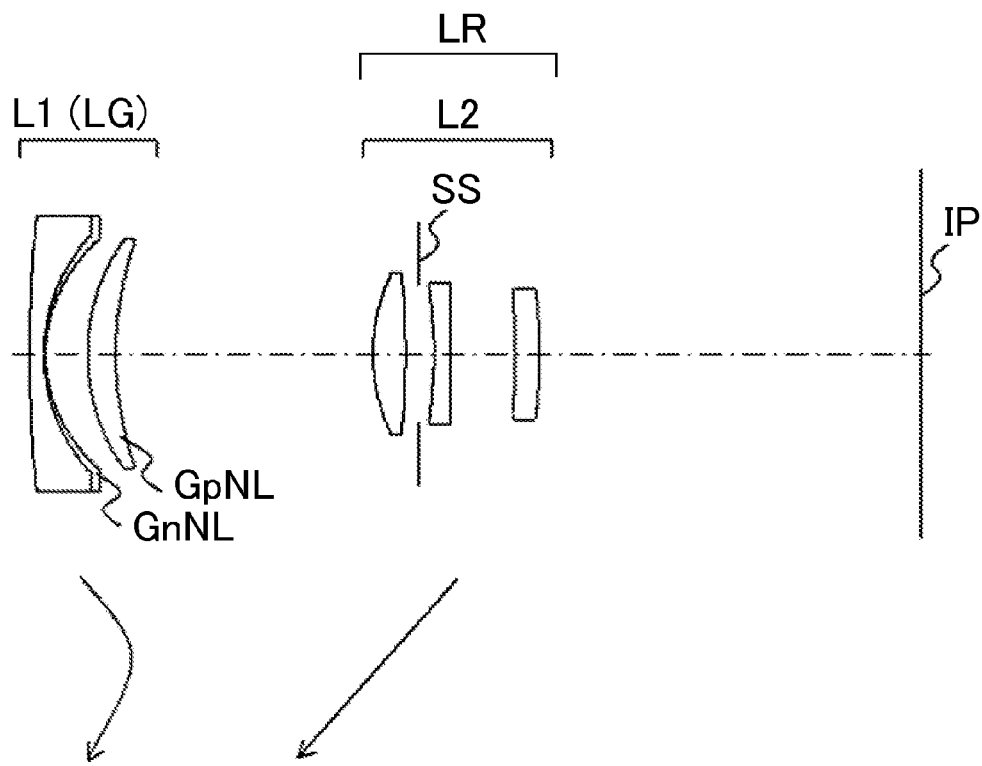
FIG. 13 is a lens sectional view at a wide-angle end according to a seventh embodiment.
Figure 14A:
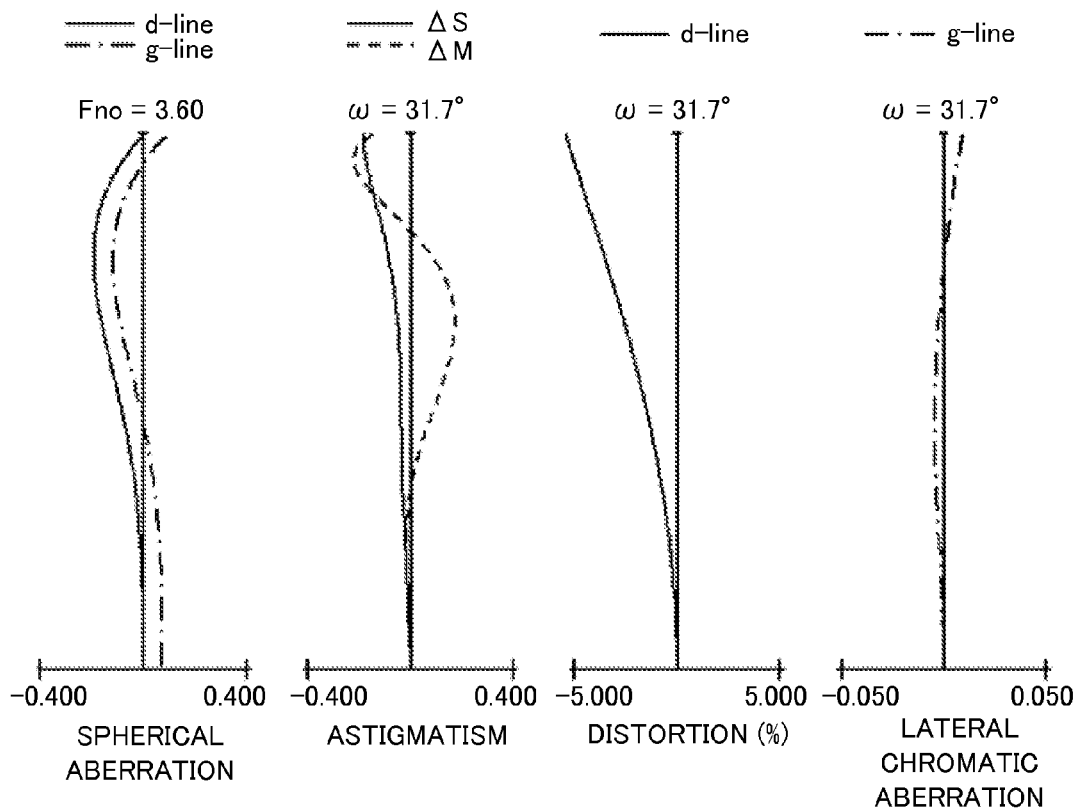
FIGS. 14A, 14B, and 14C are aberrational diagrams respectively at the wide-angle end, an intermediate zoom position, and a telephoto end according to the seventh embodiment.
Figure 14B:
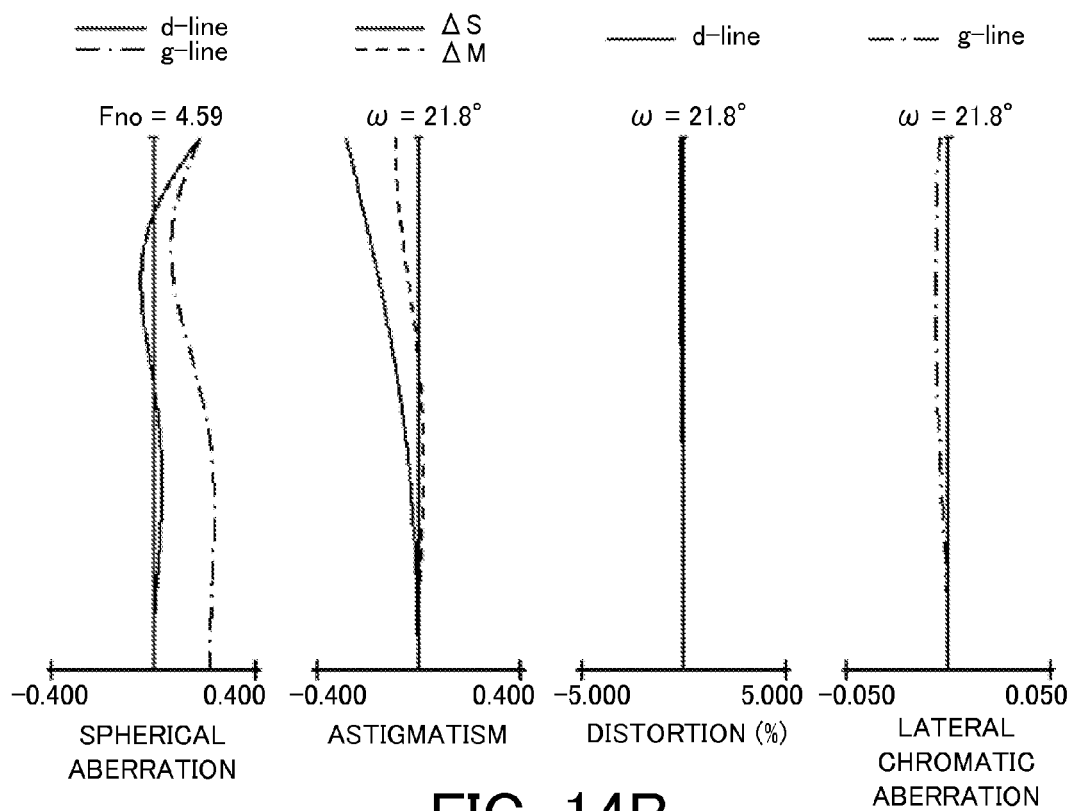
Figure 14C:
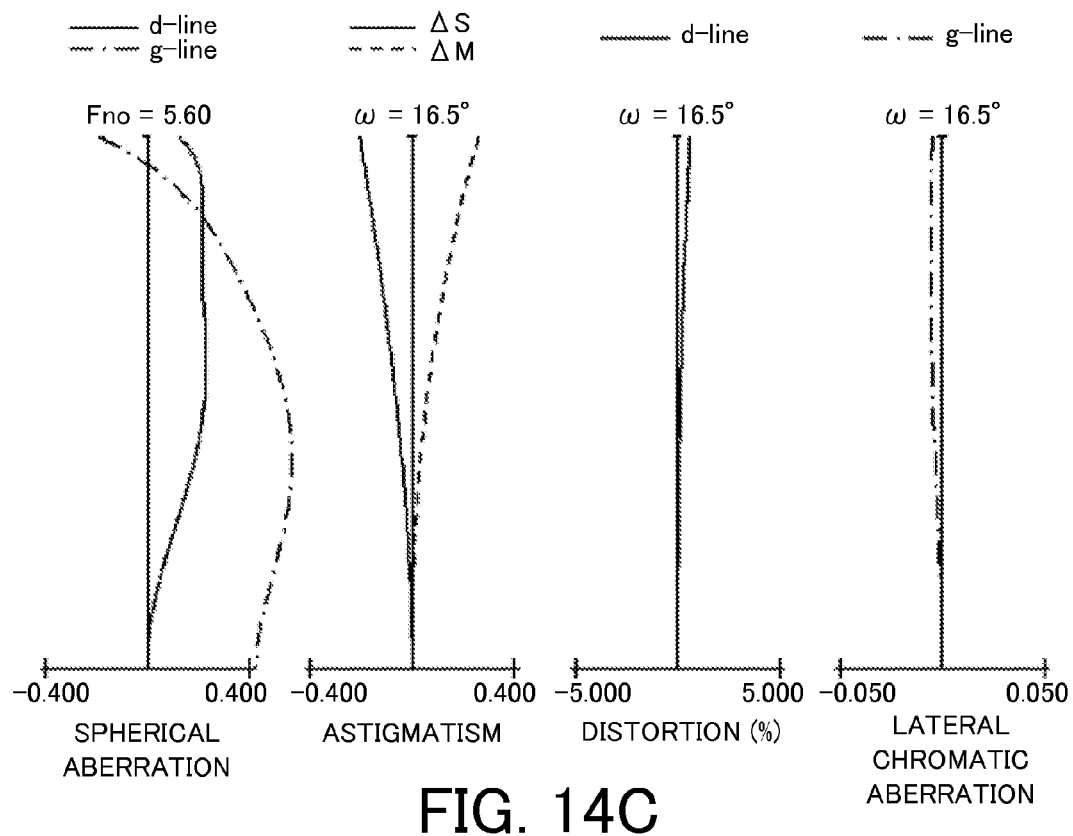
Figure 15:
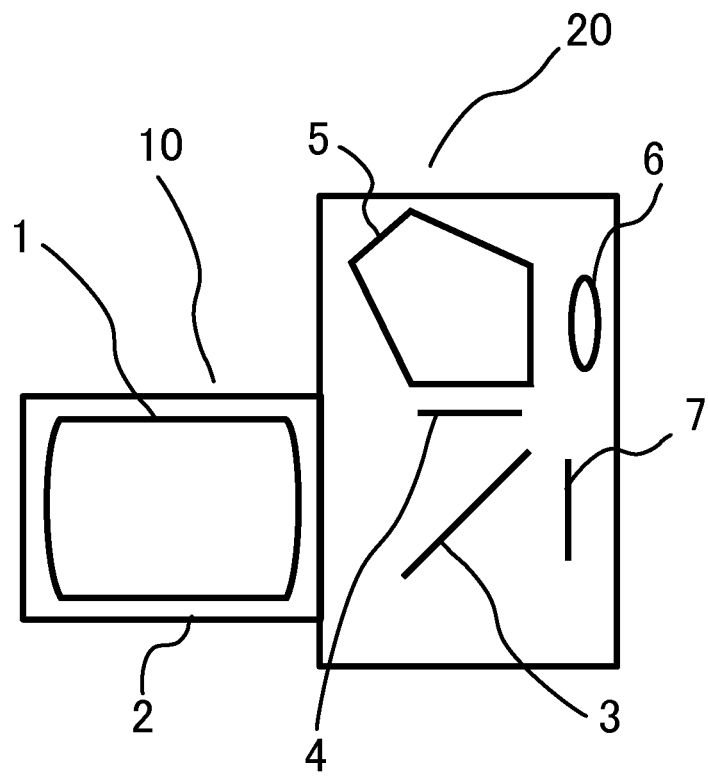
FIG. 15 is a schematic view of a principal part of an image-pickup apparatus according to the present invention.
Figure 16:
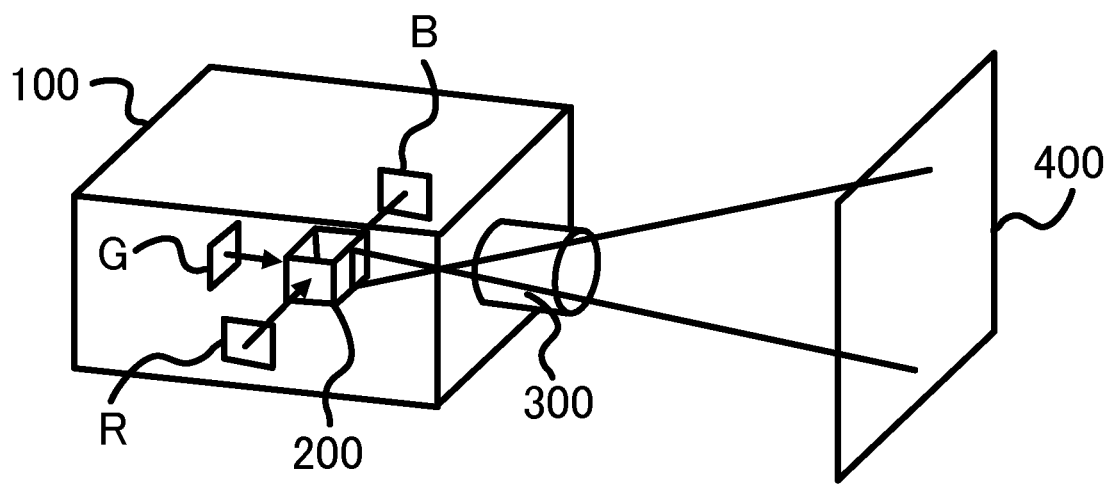
FIG. 16 is a schematic view of a principal part of a projection apparatus according to the present invention.

FIG. 13 is a sectional view at a wide-angle end of the zoom lens according to a seventh embodiment of the present invention. FIGS. 14A, 14B, and 14C are aberrational diagrams respectively at the wide-angle end, an intermediate zoom position, and a telephoto end according to the seventh embodiment. FIG. 15 is a schematic view of a principal part of a digital still camera (an image-pickup apparatus) provided with the zoom lens according to the present invention. FIG. 16 is a schematic view of a principal part of a projection apparatus provided with the zoom lens according to the present invention. The zoom lens of each embodiment may be used for an image-pickup apparatus or a projection apparatus.

In each lens sectional view, the object side (a projection surface) (at the front side) is illustrated on the left, and the image side (a projection surface) (at the rear side) is illustrated on the right. In the lens sectional views, "i" denotes the number of lens units in order from the object side, and "Li" denotes an i-th lens unit. "LR" denotes a rear unit including one or more lens units. "SS" denotes an aperture diaphragm. "FP" denotes a flare-cut diaphragm. "G" in FIGS. 9 and 11 denotes an optical block which corresponds to a prism (color combiner), and the like.

"IP" denotes an image plane. The image plane IP corresponds to an image-pickup plane of a solid-state image-pickup element (a photoelectric conversion element) such as a charge-coupled device (CCD) sensor and a complementary metal-oxide semiconductor (CMOS) sensor, when the zoom lens is used for an image-pickup optical system of a video camera or a digital camera. When the zoom lens is used for the image-pickup optical system of a film-based camera, the image plane IP corresponds to a film plane. When the zoom lens is used for a projection optical system of an image projection apparatus, the image plane IP corresponds to an image display device plane.

Arrows illustrate loci of respective lens units in zooming from the wide-angle to the telephoto end. In the aberrational diagrams, $\Delta M$ denotes a meridional image plane, and $\Delta S$ denotes a sagittal image plane. The lateral chromatic aberration is represented by the g-line. "$\omega$" denotes a half field angle, and "Fno" represents an F-number. In each embodiment, the wide-angle end and the telephoto end represent the zoom positions when the magnification varying lens units are located on both ends of mechanically movable range on the optical axis.

The zoom lens of each embodiment includes, in order from an object side to an image side, a first lens unit L1 having a negative refractive power, and a rear unit LR including one or more lens units. The zoom lens further includes an aperture diaphragm SS at the image side of the first lens unit. The distance between every adjacent lens units changes during zooming. The refractive power of the rear unit LR at the wide-angle end is positive.

In each embodiment, one lens unit LG on the object side of the aperture diaphragm SS is made of a solid material, and includes an optical element GnNL having a negative refractive power, and an optical element having a positive refractive power. Assume that an optical element GpNL is an optical element having the highest partial dispersion ratio $\theta gF$ of the material included in the lens unit LG. An Abbe number and the partial dispersion ratio of the material of the optical element GnNL are represented by $vdnNL$, and $\theta gFnNL$, respectively. The partial dispersion ratio of the material of the optical element GpNL is represented by $\theta gFpNL$. The focal length of the optical element GnNL in air is represented by $fnNL$, and the focal length of the lens unit LG is represented by $fG$.

The zoom lens satisfies the following conditional expressions:

$$0.0 < \theta gFnNL - (-1.7 \times 10^{-7} \times vdnNL^3 + 5.3 \times 10^{-5} \times vdnNL^2 - 5.7 \times 10^{-3} \times vdnNL + 0.76) < 0.4 \quad (1)$$

$$6.5 \times 10^{-4} < |((\theta gFnNL - \theta gFpNL)/vdnNL) \times |fG/fnNL|| < 5.0 \times 10^{-3} \quad (2)$$

When refractive indices at the Fraunhofer's d-line, C-line, F-line and g-line are respectively represented by nd, nC, nF, and ng, the Abbe number $vd$ and the partial dispersion ratio $\theta gF$ of the optical element are expressed by the following expression:

$$vd = (nd-1)/(nF-nC)$$

$$\theta gF = (ng-nF)/(nF-nC)$$

A description will be given of the technical meanings of the conditional expressions (1) and (2).

The conditional expression (1) defines the Abbe number and the partial dispersion ratio of the material of the optical element GnNL having a negative refractive power, which is included in the lens unit LG on the object side of the aperture diaphragm SS, and made of a solid material. The refractive power in the optical element GnNL is caused not by the diffraction but by the refraction. A material that satisfies the conditional expression (1) may be $TiO_2$ ($vd=13.84$, $\theta gF=0.873$). It is known that various physical properties such as the Abbe number and the partial dispersion ratio may be adjusted by dispersing $TiO_2$ nanoparticles (preferably having particle diameter of 1/20 of incident light wavelength, or less, more specifically) into a transparent medium such as synthesized resin, and the like.

As the angle of field is widened in a negative-lead type zoom lens in which the lens unit having a negative refractive power is closest to the object, the lateral chromatic aberrations increase at the wide-angle end and the telephoto end. Especially, when the lateral chromatic aberrations are to be corrected in a wide range, a secondary chromatic aberration increases. More specifically, the secondary lateral chromatic aberration is likely to remain on an insufficient correcting side at the wide-angle end, and the lateral chromatic aberration is likely to remain on an excessive correcting side at the telephoto end.

In a zoom lens having a zoom region on the wide angle of field side, the secondary lateral chromatic aberration is likely to incline to the insufficient correcting side. At this time, the secondary lateral chromatic aberration may be selectively corrected at the wide-angle end, and variation of the chromatic aberration caused by the zooming may be suppressed. Thereby, the secondary lateral chromatic aberrations in the entire zoom region may be well corrected. In other words, an optical element made of a material with a positive anomalous partial dispersion may be disposed with a negative refractive power at the lens unit on the object side of the aperture diaphragm SS, where variation of a pupil paraxial ray is large in zooming from the wide-angle end to the telephoto end. Such configuration enables selectively correcting the secondary lateral chromatic aberration only at the wide-angle end.

It is known that the correction effect of the lateral chromatic aberration is proportionate to the product of the height of the pupil paraxial ray and the height of an object paraxial ray. In a negative-lead type zoom lens, positions on the object side of the aperture diaphragm SS where the pupil paraxial ray remarkably varies with zooming tend to have a low height of the object paraxial ray. Accordingly, in order to correct the chromatic aberration while the influence on a monochromatic aberration is minimized, it is necessary to use a material having a higher positive anomalous partial dispersion than ever with a stronger power arrangement.

This configuration can provide a well corrected secondary lateral chromatic aberrations in the entire zoom region with a few optical elements in a zoom lens having a zoom range of a wide angle of field without using a material having a high positive anomalous partial dispersion for many lens units.

The conditional expression (1) defines ranges of the Abbe number and the partial dispersion ratio of the material of the optical element GnNL having a negative refractive power. The conditional expression (2) defines the secondary chromatic aberration correction by the optical element GnNL having a negative refractive power. A negative lens which satisfies the conditional expression (1) is disposed as the lens unit LG on the object side of the aperture diaphragm SS in a refractive power range defined in the conditional expression (2). Thereby, the secondary chromatic aberration is properly corrected at the wide-angle end in the entire lens system.

When the value is smaller than the lower limit of the conditional expression (1), the anomalous partial dispersion becomes too small for the Abbe number of the material of the optical element GnNL, the achromatic power of the optical element GnNL is weakened too much, and the correction of the secondary lateral chromatic aberration at the wide-angle end becomes insufficient. Alternatively, the optical element GnNL is required for a higher refractive power in order to correct the secondary lateral chromatic aberration, and the correction of primary chromatic aberration becomes difficult. On the other hand, when the value is larger than the upper limit of the conditional expression (1), the anomalous partial dispersion becomes too high for the Abbe number of the material of the optical element GnNL, the achromatic power of the optical element GnNL becomes too strong, and the correction of the secondary lateral chromatic aberration at the wide-angle end is undesirably excessive.

When the value is smaller than the lower limit of the conditional expression (2), the positive anomalous partial dispersion of the optical element GnNL becomes too small for the anomalous partial dispersion of a positive lens among the lens unit LG, the correction effect of chromatic aberration by the optical element GnNL is canceled, and the correction of the secondary lateral chromatic aberration becomes insufficient at the wide-angle. On the other hand, when the value exceeds the upper limit of the conditional expression (2), the positive anomalous partial dispersion of the optical element GnNL becomes too strong, the chromatic aberration correcting effect of the optical element GnNL becomes too strong, and the correction of the secondary lateral chromatic aberration at the wide-angle end is undesirably excessive.

In each embodiment, more preferably, the numerical ranges of the conditional expressions (1) and (2) may be set as follows:

$$0.03 < \theta gFnNL - (-1.7 \times 10^{-7} \times vdnNL^3 + 5.3 \times 10^{-5} \times vdnNL^2 - 5.7 \times 10^{-3} \times vdnNL + 0.76) < 0.30 \quad (1a)$$

$$7.0 \times 10^{-4} < ((\theta gFnNL - \theta gFpNL)/vdnNL) \times |fG/fnNL| < 4.5 \times 10^{-3} \quad (2a)$$

In each embodiment, the value ranges of the conditional expressions (1a) and (2a) may be set as follows:

$$0.05 < \theta gFnNL - (-1.7 \times 10^{-7} \times vdnNL^3 + 5.3 \times 10^{-5} \times vdnNL^2 - 5.7 \times 10^{-3} \times vdnNL + 0.76) < 0.20 \quad (1b)$$

$$7.5 \times 10^{-4} < ((\theta gFnNL - \theta gFpNL)/vdnNL) \times |fG/fnNL| < 4.0 \times 10^{-3} \quad (2b)$$

As described above, each embodiment arranges the optical element GnNL having a negative refractive power which is made of a material and has a positive anomalous partial dispersion, with the most suitable refractive power at the lens unit LG on the object side of the aperture diaphragm SS in the negative-lead type zoom lens. This configuration provides a zoom lens in which an increase of the lateral chromatic aberration at wide-angle end is corrected in widening the angle of field, and a good optical performance is maintained in the entire zoom range. Note that the zoom lens in each embodiment may satisfy one or more of the following conditional expressions. Thereby, advantages corresponding to each conditional expression may be obtained.

Assume that vdpNL denotes an Abbe number of the optical element GpNL, fpNL denotes a focal length of the optical element GpNL in air, f1 denotes a focal length of the first lens unit L1, and fw denotes a focal length of the entire system at wide-angle end. The zoom lens further includes at least one optical element Gpr having a positive refractive power on the image side of the aperture diaphragm SS, and the Abbe number of the material of the optical element Gpr is represented by vdprNL, the partial dispersion ratio of the material of the optical element Gpr is represented by θgFprNL.

One or more of the following conditional expressions may be satisfied:

$$vdnNL - vdpNL| < 40 \quad (3)$$

$$1.0 < |fnNL|/fpNL < 10.0 \quad (4)$$

$$60 < vdprNL < 100 \quad (5)$$

$$0.005 < \theta gFprNL - (-1.6 \times 10^{-3} \times vdprNL + 0.64) < 0.100 \quad (6)$$

$$1.0 < |f1|/fw < 7.0 \quad (7)$$

A description will now be given of technical meanings of each conditional expression. The conditional expression (3) relates to a primary achromatic performance in the lens unit LG on the object side of the aperture diaphragm SS. When the lens unit LG on the object side of the aperture diaphragm SS is a lens unit having a negative refractive power, and when an optical element GnNL made of a material with a highly positive anomalous partial dispersion that satisfies the conditional expression (1) is simply disposed with a negative refractive power, the optical element GnNL has a high dispersion characteristic. Accordingly, the correction of the primary achromatic performance in the lens unit LG becomes insufficient.

When the optical element GnNL corrects the secondary lateral chromatic aberration at the wide-angle end in the entire optical system, the primary chromatic aberration in the lens unit may be kept in an overcorrection state by an optical element other than the optical element GnNL. An optical element having a positive refractive power in the lens unit LG is set to the optical element GpNL with a high dispersion, and the primary achromatic performance in the lens unit LG and the secondary lateral chromatic aberration in the entire optical system may be corrected.

When the value exceeds the upper limit of conditional expression (3), the Abbe number of the material of the optical element GpNL becomes too large, and the correction of the primary chromatic aberration becomes insufficient. Alternatively, the optical element GnNL has an insufficient refractive power due to the primary achromatic performance in the lens unit LG and the correction of the secondary lateral chromatic aberration becomes insufficient at the wide-angle end in the entire optical system.

The conditional expression (4) defines a refractive power distribution between the optical element GnNL having a negative refractive power and the optical element GpNL having a positive refractive power. When the value exceeds the upper limit of the conditional expression (4), the refractive power of the optical element GnNL becomes too weak, or the refractive power of the optical element GpNL becomes too strong. As a result, the correction of the secondary lateral chromatic aberration is insufficient at the wide-angle end in the entire optical system. On the other hand, when the value is smaller than the lower limit, the refractive power of the optical element GnNL becomes too strong, or the refractive power of the optical element GpNL becomes too weak. As a result, the correction of the primary chromatic aberration becomes insufficient in the lens unit LG.

The conditional expressions (5) and (6) respectively define the Abbe number and the anomalous partial dispersion of the material of at least one optical element Gpr having a positive refractive power disposed on the image side of the aperture diaphragm SS. In the zoom lens of each embodiment, the lens unit on the image side of the aperture diaphragm SS may include at least one optical element Gpr having a positive refractive power which satisfies the conditional expressions (5) and (6). The lens unit on the image side of the aperture diaphragm SS has a small variation amount of the pupil paraxial ray in zooming from the wide-angle end to the telephoto end, and can provide similar influence on the lateral chromatic aberration in the entire zoom region.

Thus, an optical element Gpr which satisfies the conditional expressions (5) and (6) may be used with a positive refractive power for the lens unit on the image side of the aperture diaphragm SS. When the optical element Gpr is arranged in a range such that the secondary lateral chromatic aberration at the telephoto end is not overcorrected, it becomes easy to distribute the correction of the lateral chromatic aberration at the wide-angle end and to correct the secondary axial chromatic aberration at the telephoto end.

When the value exceeds the upper limit of the conditional expression (5), the material is likely to have an excessively low dispersion, and generally to be low in refractive index. Thereby, it becomes difficult to correct a monochromatic aberration, especially the curvature of field at the wide-angle end. On the other hand, when the value is smaller than the lower limit, the material has an excessively high dispersion that makes difficult the correction of the primary chromatic aberration.

When the value exceeds the upper limit of conditional expression (6), the anomalous partial dispersion of an optical element becomes excessively high in the positive direction, and the secondary lateral chromatic aberration is overcorrected at the telephoto end. On the other hand, when the value is smaller than the lower limit, the anomalous partial dispersion of the optical element is reversed and the secondary chromatic aberration is reversely corrected.

The conditional expression (7) defines the negative refractive power of the first lens unit L1. When the value exceeds the upper limit of the conditional expression (7), the negative refractive power of the first lens unit L1 becomes too small and the entire optical system is enlarged. On the other hand, when the value is smaller than the lower limit, the negative refractive power of the first lens unit L1 becomes too large and it becomes difficult to correct the curvature of field especially at the wide-angle end.

In each embodiment, the numerical ranges of the conditional expressions (3) to (7) may be set as follows:

$$|vdnNL - vdpNL| < 38 \tag{3a}$$

$$1.5 < |fnNL|/fpNL < 9.0 \tag{4a}$$

$$63 < vdprNL < 100 \tag{5a}$$

$$0.01 < \theta gFprNL - (-1.6 \times 10^{-3} \times vdprNL + 0.64) < 0.08 \tag{6a}$$

$$1.1 < |f1|/fw < 6.0 \tag{7a}$$

In each embodiment, the numerical ranges of the conditional expressions (3a) to (7a) may be set as follows:

$$|vdnNL - vdpNL| < 35 \tag{3b}$$

$$2.0 < |fnNL|/fpNL < 8.0 \tag{4b}$$

$$65 < vdprNL < 100 \tag{5b}$$

$$0.015 < \theta gFprNL - (-1.6 \times 10^{-3} \times vdprNL + 0.64) < 0.060 \tag{6b}$$

$$1.2 < |f1|/fw < 5.5 \tag{7b}$$

In the first, second, fourth to sixth embodiments, the lens unit LG on the object side of the aperture diaphragm SS, where the optical element GnNL having a negative refractive power is disposed, has a negative refractive power. By disposing an optical element GnNL which satisfies the conditional expressions (1) and (2) at the lens unit LG having a negative refractive power, and further satisfies the conditional expressions (3) and (4), the primary and secondary lateral chromatic aberrations can be more easily and properly corrected.

The optical element GnNL is cemented with a negative lens. In the first and seventh embodiments, the optical element GnNL is cemented with a negative lens closest to the object.

In the first, second, fifth, and sixth embodiments, the optical element GnNL having a negative refractive power is disposed at the first lens unit L1 having a negative refractive power closest to the object, in which the variation of the pupil paraxial ray is especially large in zooming from the wide-angle end to the telephoto end. Each embodiment may also take an image stabilization lens unit in which one lens unit or a partial lens unit is configured to move in a direction having a component vertical to the optical axis so as to stabilize an image.

As described above, each embodiment can provide a zoom lens configured to reduce an increase of the lateral chromatic aberration at the wide-angel end while the angle of field is widened, and to possess a good optical performance in the entire zoom range.

Next, a lens configuration of each embodiment will be described.

First Embodiment

Referring now to FIG. 1, a zoom lens according to the first embodiment of the present invention will be described. The zoom lens of the first embodiment is a four-unit zoom lens which includes, in order from an object side to an image side, a first lens unit L1 having a negative refractive power, a second lens unit L2 having a positive refractive power, a third lens unit L3 having a negative refractive power, and a fourth lens unit L4 having a positive refractive power. The rear unit LR includes the second lens unit L2 to the fourth lens unit L4.

In the first embodiment, in zooming from the wide-angle end to the telephoto end, the lens unit L1 moves with a locus convex on the image side as illustrated by an arrow so as to compensate a fluctuation of an image plane caused by the magnification variation. The second lens unit L2, the third lens unit L3, and the fourth lens unit L4 are respectively magnification varying lens units, and move to the object side. The aperture diaphragm SS is disposed on the object side of the third lens unit L3, and moves together with the third lens unit L3 (with the same locus). The flare-cut diaphragm FP is disposed on the image side of the third lens unit L3, and moves together with the third lens unit L3.

The zoom lens adopts an inner-type for focusing from an infinity object to a finite distance object, in which a partial lens unit L2a that is a part of the second lens unit L2 moves on the optical axis. In the first embodiment, the optical element GnNL having a negative refractive power which satisfies the conditional expressions (1) and (2) is disposed at the first lens unit L1.

More specifically, the optical element GnNL is cemented with the negative lens closest to the object of the first lens unit L1. The optical element GnNL is disposed at the first lens unit L1 closest to the object, in which the variation of the pupil paraxial ray is large in zooming from the wide-angle end to the telephoto end. Thereby, the secondary lateral chromatic aberration is properly corrected at the wide-angle end. The interface surface of the optical element GnNL with air has an aspherical shape. This configuration can properly correct the curvature of field and the distortion at the wide-angle end.

Second Embodiment

Referring now to FIG. 3, a description will be given of a zoom lens according to a second embodiment of the present invention. The zoom lens of the second embodiment is a six-unit zoom lens which includes, in order from an object side to an image side, a first lens unit L1 having a negative refractive power, a second lens unit L2 having a positive refractive power, a third lens unit L3 having a negative refractive power, a fourth lens unit L4 having a positive refractive power, a fifth lens unit L5 having a negative refractive power, and a sixth lens unit L6 having a positive refractive power. The rear unit LR includes the second lens unit L2 to the sixth lens unit L6.

In the second embodiment, in zooming from the wide-angle end to the telephoto end, the lens unit L3 moves with a locus convex on the image side as illustrated by an arrow so as to compensate a fluctuation of an image plane caused by the magnification variation. The first lens unit L1 is a magnification varying lens unit, and moves to the image side. The second lens unit L2, the fourth lens unit L4, and the fifth lens unit L5 are respectively magnification varying lens units, and move to the object side. The sixth lens unit L6 is fixed in zooming. The positions and operations of the aperture diaphragm SS and the flare-cut diaphragm FP are respectively the same as those in the first embodiment.

The zoom lens adopts an inner-type for focusing from an infinity object to a finite distance object, in which the fifth lens unit L5 moves on the optical axis.

In the second embodiment, the optical element GnNL having a negative refractive power which satisfies the conditional expressions (1) and (2) is disposed at the first lens unit L1. More specifically, the optical element GnNL is configured as a part of a three-piece cemented lens in which the optical element GnNL is sandwiched and cemented with a negative lens and a positive lens in the first lens unit L1. The optical element GnNL is disposed at the first lens unit L1 closest to the object, in which the variation of the pupil paraxial ray is large in zooming from the wide-angle end to the telephoto end. Thereby, the secondary lateral chromatic aberration is well corrected at the wide-angle end.

The optical element GnNL may be configured as a part of a three-piece cemented lens including an optical material such as glass and light transmitting ceramic. Thereby, the zoom lens may be further environmentally-resistant by making the optical element GnNL of a synthetic resin.

Third Embodiment

Referring now to FIG. 5, a description will be given of a zoom lens according to a third embodiment of the present invention. The zoom lens of the third embodiment takes the same zoom-type and the focusing-type as those of the second embodiment illustrated in FIG. 3. The third embodiment differs from the second embodiment in arrangement of the optical element GnNL, and in lens shape in each lens unit.

In the third embodiment, the optical element GnNL having a negative refractive power which satisfies the conditional expressions (1) and (2) is disposed at the second lens unit L2. More specifically, the optical element GnNL is a part of a three-piece cemented lens in which the optical element GnNL is sandwiched and cemented with a negative lens and a positive lens in the second lens unit L2. The optical element GnNL is disposed at the second lens unit L2 where the pupil paraxial ray and the object paraxial ray are high at the wide-angle end. Thereby, the secondary lateral chromatic aberration is well corrected at the wide-angle end.

The optical element GnNL may be configured as a part of a three-piece cemented lens including an optical material such as glass and light transmitting ceramic. Thereby, the zoom lens may be further environmentally-resistant by making the optical element GnNL of a synthetic resin.

Fourth Embodiment

Referring now to FIG. 7, a description will be given of a zoom lens according to a fourth embodiment of the present invention. The zoom lens of fourth embodiment is a five-unit zoom lens which includes, in order from an object side to an image side, a first lens unit L1 having a negative refractive power, a second lens unit L2 having a negative refractive power, a third lens unit L3 having a positive refractive power, a fourth lens unit L4 having a negative refractive power, and a fifth lens unit L5 having a positive refractive power. The rear unit LR includes the second lens unit L2 to the fifth lens unit L5.

In the fourth embodiment, in zooming from the wide-angle end to the telephoto end, the first lens unit L1 moves with a locus convex on the image side as illustrated by an arrow so as to compensate a fluctuation of an image plane caused by the magnification variation. The second lens unit L2 is a magnification varying lens unit, and moves to the image side with a locus convex on the image side. The third lens unit L3, the fourth lens unit L4, and the fifth lens unit L5 are respectively magnification varying lens units, and move to the object side. The aperture diaphragm SS is disposed in the third lens unit L3, and moves together with the third lens unit L3.

The zoom lens adopts an inner-type for focusing from an infinity object to a finite distance object, in which the second lens unit L2 moves on the optical axis.

In the fourth embodiment, the optical element GnNL having a negative refractive power which satisfies the conditional expressions (1) and (2) is disposed at the second lens unit L2. More specifically, the optical element GnNL is cemented with the negative lens closest to the object of the second lens unit L2. The optical element GnNL is disposed at the second lens unit L2 where the variation of the pupil paraxial ray is large in zooming from the wide-angle end to the telephoto end. The secondary lateral chromatic aberration is well corrected at the wide-angle end. The interface surface of the optical element GnNL with air has an aspherical shape. This configuration properly corrects the curvature of field and the distortion at the wide-angle end.

Fifth Embodiment

Referring now to FIG. 9, a description will be given of a zoom lens according to a fifth embodiment of the present invention. The zoom lens of the fifth embodiment is a four-unit zoom lens which includes, in order from an object side, a first lens unit L1 having a negative refractive power, a second lens unit L2 having a positive refractive power, a third lens unit L3 having a positive refractive power, and a fourth lens unit L4 having a positive refractive power. The rear unit LR includes the second lens unit L2 to the fourth lens unit L4.

The zoom lens of this embodiment is used for a projector. The screen (magnification side) is on the left, and the projection surface (reduction side) is on the right. G denotes a color splitting and combining prism. IP corresponds to a projection surface.

In the fifth embodiment, in zooming from the wide-angle end to the telephoto end, the second lens unit L2 moves with a locus convex on the magnification side as illustrated by an arrow so as to compensate a fluctuation of an image plane caused by the magnification variation. The third lens unit L3 is a magnification varying lens unit, and moves to the magnification side. The first lens unit L1, and the fourth lens unit L4 are fixed relative to the image plane in the magnification variation. The aperture diaphragm SS is disposed in the fourth lens unit L4 on the magnification side, and is fixed relative to the image plane in the magnification variation. The zoom lens adopts an inner-type for focusing from a long distance to a short distance, in which the second lens unit L2 moves on the optical axis.

In the fifth embodiment, the optical element GnNL having a negative refractive power which satisfies the conditional expressions (1) and (2) is disposed at the first lens unit L1. More specifically, the optical element GnNL is cemented with the negative lens closest to the magnification side of the first lens unit L1. The optical element GnNL is disposed at the first lens unit L1 where the variation of the pupil paraxial ray is large in zooming from the wide-angle end to the telephoto end. Thereby, the secondary lateral chromatic aberration is well corrected at the wide-angle end.

Sixth Embodiment

Referring now to FIG. 11, a description will be given of a zoom lens according to a sixth embodiment of the present invention. The zoom lens of the sixth embodiment takes the same zoom-type and the focusing-type as those of the fifth embodiment illustrated in FIG. 9. The sixth embodiment differs from the fifth embodiment in arrangement of the optical element GnNL, and in lens shape in each lens unit.

In the sixth embodiment, the optical element GnNL having a negative refractive power which satisfies the conditional expressions (1) and (2) is disposed at the first lens unit L1. More specifically, the optical element GnNL is cemented with the negative lens in the first lens unit L1. The optical element GnNL is disposed at the first lens unit L1 closest to the magnification side, in which the variation of the pupil paraxial ray is large in zooming from the wide-angle end to the telephoto end. The secondary lateral chromatic aberration is well corrected at the wide-angle end. The interface surface of the optical element GnNL with air has an aspherical shape. This configuration properly corrects the curvature of field and the distortion at the wide-angle end.

Seventh Embodiment

Referring now to FIG. 13, a description will be given of a zoom lens according to a seventh embodiment of the present invention. The zoom lens of the seventh embodiment is a two-unit zoom lens which includes, in order from an object side to an image side, a first lens unit L1 having a negative refractive power, and a second lens unit L2 having a positive refractive power. The rear unit LR is the second lens unit L2.

In the seventh embodiment, in zooming from the wide-angle end to the telephoto end, the first lens unit L1 moves with a locus convex on the image side as illustrated by an arrow so as to compensate a fluctuation of an image plane caused by the magnification variation. The second lens unit L2 is a magnification varying lens unit, and moves to the object side. The zoom lens adopts a front-focus-type for focusing from an infinity object to a finite distance object, in which the first lens unit L1 moves on the optical axis.

In the seventh embodiment, the optical element GnNL having a negative refractive power which satisfies the conditional expressions (1) and (2) is disposed at the first lens unit L1. More specifically, the optical element GnNL is cemented with the negative lens in the first lens unit L1. The optical element GnNL is disposed at the first lens unit L1 where the variation of the pupil paraxial ray is large in zooming from the wide-angle end to the telephoto end. Thereby, the secondary lateral chromatic aberration is well corrected at the wide-angle end. The interface surface of the optical element GnNL with air has an aspherical shape. This configuration properly corrects the curvature of field and the distortion at the wide-angle end.

Specific numerical data of numerical examples 1 to 7 will be illustrated which correspond to the first embodiment to the seventh embodiment of the present invention. In each numerical example, denotes the order of the surface counted from the object side, "ri" denotes a radius of curvature of an i-th optical surface (i-th surface), "di" denotes a distance between the i-th surface and (i+1)-th surface, "ndi" denotes a refractive index of the material of the i-th optical member for the d-line, and "vdi" denotes an Abbe number thereof. "θgFi" denotes a partial dispersion ratio, "f" denotes a focal length, "Fno" denotes an F number, and "ω" denotes a half angle of view. "BF" denotes a back focus, and is expressed by a distance from the final surface.

The aspherical shape is expressed by the following formula:

$$x=(h^2/r)/[1+\{1-(1+K)\times(h/r)^2\}^{1/2}]+A4\times h^4+A6\times h^6+A8\times h^8+A10\times h^{10}+A12\times h^{12},$$

where a light traveling direction is set positive, "x" is a displacement amount from the surface vertex in the optical axis direction, "h" is a height from the axis in a direction vertical to the optical axis, "r" is a paraxial curvature radius, "K" is a conical constant, and A4, A6, A8, A10, and A12 are aspherical (lens) surface coefficients.

Note that "E±XX" in each aspherical (lens) surface coefficient represents "×10$^{\pm XX}$" Table 1 illustrates a relationship between the above conditional expressions and each numerical example. Herein, "E±XX" of values represents "×10$^{\pm XX}$". Table 2 illustrates a refractive index, an Abbe number, and a partial dispersion ratio at the d-line, the g-line, the C-line and the F-line of the optical element GnNL used in each numerical example.

Numerical Example 1

| UNIT mm | | | | | |
|---|---|---|---|---|---|
| Surface data | | | | | |
| Surface Number | r | d | nd | vd | effective diameter |
| 1* | 282.159 | 2.30 | 1.77250 | 49.6 | 54.22 |
| 2 | 24.138 | 0.10 | 1.61932 | 15.1 | 39.51 |
| | | | | | θgFnNL = 0.864 |
| 3* | 20.969 | 11.77 | | | 37.63 |
| 4 | 2137.293 | 1.80 | 1.80400 | 46.6 | 36.34 |
| 5* | 46.180 | 6.51 | | | 32.20 |
| 6 | −106.338 | 1.60 | 1.83400 | 37.2 | 31.67 |
| 7 | 149.619 | 0.15 | | | 31.45 |
| 8 | 49.394 | 4.91 | 1.80809 | 22.8 | 31.57 |
| | | | | | θgFpNL = 0.631 |
| 9 | −495.380 | (variable) | | | 31.03 |
| 10 | 49.395 | 1.30 | 1.80518 | 25.4 | 24.47 |
| 11 | 24.287 | 6.38 | 1.54072 | 47.2 | 24.63 |
| 12 | −77.160 | 0.15 | | | 25.18 |
| 13 | 68.076 | 2.18 | 1.80400 | 46.6 | 25.76 |
| 14 | 110.886 | 4.58 | | | 25.70 |
| 15 | 59.607 | 4.24 | 1.62299 | 58.2 | 25.96 |
| 16 | −69.199 | (variable) | | | 25.80 |
| 17(diaphragm) | ∞ | 1.90 | | | 22.32 |
| 18 | −117.208 | 1.40 | 1.88300 | 40.8 | 21.75 |
| 19 | 110.619 | 2.23 | | | 21.44 |
| 20 | −43.385 | 1.10 | 1.76200 | 40.1 | 21.42 |
| 21 | 21.478 | 4.99 | 1.84666 | 23.8 | 22.44 |
| 22 | −188.243 | 1.23 | | | 22.61 |
| 23(flare-diaphragm) | ∞ | (variable) | | | 22.78 |
| 24 | 30.974 | 7.93 | 1.49700 | 81.5 | 23.07 |
| | | | | | θgF = 0.537 |
| 25 | −23.050 | 1.20 | 1.84666 | 23.9 | 22.54 |
| 26 | −37.999 | 0.20 | | | 22.68 |
| 27 | 533.780 | 1.20 | 1.83400 | 37.2 | 21.78 |
| 28 | 19.618 | 6.66 | 1.49700 | 81.5 | 22.28 |
| | | | | | θgF = 0.537 |
| 29 | −71.045 | 0.20 | | | 23.39 |
| 30 | 356.490 | 2.35 | 1.58313 | 59.4 | 24.19 |
| 31* | −112.935 | (variable) | | | 24.74 |
| image plane | ∞ | | | | |

| Aspherical surface data | | |
|---|---|---|
| First surface | | |
| K = −5.46193e+002 | A4 = 1.69807e−005 | A6 = −2.57922e−008 |
| A8 = 3.76981e−011 | A10 = −2.93874e−014 | A12 = 1.05256e−017 |
| Third surface | | |
| K = 3.94144e−002 | A4 = −4.18740e−006 | A6 = −9.63302e−009 |
| A8 = −1.09837e−011 | A10 = 2.04504e−014 | |
| Fifth surface | | |
| K = 5.90989e−001 | A4 = 1.39555e−005 | A6 = 1.19605e−008 |
| A8 = −7.22100e−011 | A10 = 1.68304e−013 | A12 = −1.90500e−016 |
| Thirty-first surface | | |
| K = 3.98922e+001 | A4 = 9.81358e−006 | A6 = 1.77241e−008 |
| A8 = −1.53025e−011 | A10 = 3.60517e−014 | |

Various data
Zoom ratio 2.12

| | Wide-angle | intermediate | telephoto |
|---|---|---|---|
| Focal length | 16.01 | 24.10 | 34.00 |
| F number | 3.02 | 3.12 | 3.21 |
| Half field angle (°) | 53.50 | 41.92 | 32.47 |
| Image height | 21.64 | 21.64 | 21.64 |
| Lens overall length | 157.53 | 149.88 | 153.40 |
| BF | 39.00 | 49.53 | 63.21 |
| d9 | 28.77 | 11.28 | 2.01 |
| d16 | 0.93 | 4.30 | 7.20 |
| d23 | 8.26 | 4.20 | 0.41 |
| d31 | 39.00 | 49.53 | 63.21 |
| Incident pupil position | 19.49 | 18.81 | 18.73 |
| Exit pupil position | −52.28 | −39.76 | −30.78 |
| Front principal-point | 32.69 | 36.41 | 40.43 |
| Rear principal point | 22.99 | 25.43 | 29.22 |

| Zoom lens unit data | | | | | |
|---|---|---|---|---|---|
| unit | starting surface | focal length | lens configured length | front principal point | rear principal point |
| 1 | 1 | 20.93 | 29.14 | 3.52 | −21.00 |
| 2 | 10 | 30.33 | 18.84 | 8.08 | −6.38 |
| 3 | 17 | −40.79 | 12.85 | 2.51 | −7.01 |
| 4 | 24 | 49.38 | 19.74 | 5.59 | −8.47 |

| Single lens data | | |
|---|---|---|
| Lens | starting surface | focal length |
| 1 | 1 | −34.30 |
| 2 | 2 | −261.01 |
| 3 | 4 | −58.73 |
| 4 | 6 | −74.32 |
| 5 | 8 | 55.81 |
| 6 | 10 | −60.74 |
| 7 | 11 | 34.93 |
| 8 | 13 | 214.44 |
| 9 | 15 | 52.06 |
| 10 | 18 | −64.26 |
| 11 | 20 | −18.72 |
| 12 | 21 | 23.02 |
| 13 | 24 | 27.95 |
| 14 | 25 | −71.85 |
| 15 | 27 | −24.45 |
| 16 | 28 | 31.70 |
| 17 | 30 | 147.35 |

Numerical Example 2

UNIT mm

Surface data

| Surface Number | r | d | nd | vd | effective diameter |
|---|---|---|---|---|---|
| 1* | 184.610 | 2.50 | 1.77250 | 49.6 | 58.42 |
| 2 | 33.433 | 12.73 | | | 47.64 |
| 3 | −167.246 | 2.30 | 1.77250 | 49.6 | 46.94 |
| 4 | 105.610 | 0.18 | 1.61937 | 19.2 | 45.53 |
| | | | | | θgFnNL = 0.748 |
| 5 | 62.389 | 4.59 | 1.92286 | 18.9 | 45.16 |
| | | | | | θgFpNL = 0.650 |
| 6 | 178.037 | (variable) | | | 44.65 |
| 7 | 904.178 | 1.90 | 1.80518 | 25.4 | 27.06 |
| 8 | 51.491 | 6.48 | 1.77250 | 49.6 | 26.40 |
| 9 | −132.108 | 0.15 | | | 25.65 |
| 10 | 89.842 | 3.92 | 1.83481 | 42.7 | 25.98 |
| 11 | −723.693 | 0.15 | | | 26.06 |
| 12 | 43.869 | 5.25 | 1.69680 | 55.5 | 26.12 |
| 13 | 484.593 | (variable) | | | 25.30 |
| 14 (diaphragm) | ∞ | 2.21 | | | 17.83 |
| 15 | −122.925 | 1.30 | 1.88300 | 40.8 | 17.12 |
| 16 | 44.454 | 2.19 | | | 16.81 |
| 17 | −109.062 | 1.30 | 1.71999 | 50.2 | 16.91 |
| 18 | 38.624 | 2.48 | 1.80518 | 25.4 | 17.23 |
| 19 | −106.734 | 0.69 | | | 17.34 |
| 20 (flare-diaphragm) | ∞ | (variable) | | | 17.38 |
| 21 | 121.354 | 1.30 | 1.84666 | 23.9 | 19.19 |
| 22 | 26.451 | 4.23 | 1.49700 | 81.5 | 20.01 |
| | | | | | θgF = 0.537 |
| 23 | −63.654 | 0.15 | | | 20.82 |
| 24 | 34.070 | 4.19 | 1.65160 | 58.5 | 22.96 |
| 25 | −150.671 | (variable) | | | 23.14 |
| 26 | 302.906 | 2.65 | 1.84666 | 23.9 | 23.18 |
| 27 | −47.343 | 0.21 | | | 23.18 |
| 28 | −50.272 | 1.20 | 1.83400 | 37.2 | 23.03 |
| 29 | 26.891 | (variable) | | | 22.93 |
| 30 | 62.832 | 4.68 | 1.58313 | 59.4 | 31.90 |
| 31* | −100.352 | 40.33 | | | 32.28 |
| image plane | ∞ | | | | |

Aspherical (lens) surface data

First surface

K = 0.00000e+000   A4 = 1.30907e−006   A6 = 4.09149e−010
A8 = −1.26586e−012   A10 = 1.24314e−015   A12 = −4.49322e−019

Thirty-first surface

K = 0.00000e+000   A4 = −3.19475e−007   A6 = −9.95606e−009
A8 = 5.99583e−011   A10 = −1.90767e−013   A12 = 2.31903e−016

Various data
Zoom ratio 2.75

| | Wide-angle | intermediate | telephoto |
|---|---|---|---|
| Focal length | 24.70 | 37.34 | 68.00 |
| F number | 3.43 | 3.66 | 4.12 |
| Half field angle (°) | 41.22 | 30.09 | 17.65 |
| Image height | 21.64 | 21.64 | 21.64 |
| Lens overall length | 191.27 | 172.72 | 157.74 |
| BF | 40.33 | 40.33 | 40.33 |
| d 6 | 56.93 | 28.76 | 4.16 |
| d13 | 4.22 | 8.36 | 20.23 |
| d20 | 16.90 | 12.16 | −0.30 |
| d25 | −0.05 | 3.11 | 9.92 |
| d29 | 4.01 | 11.06 | 14.46 |
| Incident pupil position | 31.16 | 29.15 | 33.66 |
| Exit pupil position | −68.52 | −83.08 | −65.13 |
| Front principal point | 50.26 | 55.19 | 57.81 |
| Rear principal point | 15.63 | 2.99 | −27.67 |

Zoom lens unit data

| unit | starting surface | focal length | lens configured length | front principal point | rear principal point |
|---|---|---|---|---|---|
| 1 | 1 | −37.08 | 22.29 | 5.23 | −11.71 |
| 2 | 7 | 32.78 | 17.85 | 5.81 | −4.47 |
| 3 | 14 | −43.08 | 10.17 | 1.62 | −6.46 |
| 4 | 21 | 39.63 | 9.87 | 4.57 | −1.63 |
| 5 | 26 | −37.72 | 4.06 | 2.75 | 0.42 |
| 6 | 30 | 66.97 | 4.68 | 1.15 | −1.84 |

Single lens data

| Lens | starting surface | focal length |
|---|---|---|
| 1 | 1 | −53.23 |
| 2 | 3 | −83.49 |
| 3 | 4 | −246.52 |
| 4 | 5 | 102.13 |
| 5 | 7 | −67.88 |
| 6 | 8 | 48.71 |
| 7 | 10 | 95.95 |
| 8 | 12 | 68.89 |
| 9 | 15 | −36.84 |
| 10 | 17 | −39.47 |
| 11 | 18 | 35.49 |
| 12 | 21 | −40.20 |
| 13 | 22 | 38.19 |
| 14 | 24 | 43.03 |
| 15 | 26 | 48.53 |
| 16 | 28 | −20.86 |
| 17 | 30 | 66.97 |

Numerical Example 3

UNIT mm

Surface data

| Surface Number | r | d | nd | vd | effective diameter |
|---|---|---|---|---|---|
| 1* | 144.470 | 2.50 | 1.77250 | 49.6 | 59.89 |
| 2 | 31.821 | 12.85 | | | 48.25 |
| 3 | −323.099 | 2.30 | 1.77250 | 49.6 | 47.67 |
| 4 | 63.648 | 0.20 | | | 45.60 |
| 5 | 54.540 | 5.54 | 1.84666 | 23.8 | 45.69 |
| | | | | | θgFpNL = 0.621 |
| 6 | 143.980 | (variable) | | | 44.85 |
| 7 | −797.923 | 1.90 | 1.80610 | 33.3 | 21.90 |
| 8 | 59.238 | 0.10 | 1.61932 | 15.1 | 22.56 |
| | | | | | θgFnNL = 0.864 |
| 9 | 47.576 | 5.99 | 1.77250 | 49.6 | 22.69 |
| 10 | −126.355 | 0.15 | | | 23.70 |
| 11 | 93.158 | 2.81 | 1.83481 | 42.7 | 24.15 |
| 12 | −1025.615 | 0.15 | | | 24.23 |
| 13 | 42.534 | 3.74 | 1.69680 | 55.5 | 24.34 |
| 14 | 737.814 | (variable) | | | 23.90 |
| 15 (diaphragm) | ∞ | 2.21 | | | 18.47 |
| 16 | −120.919 | 1.30 | 1.88300 | 40.8 | 17.83 |
| 17 | 45.635 | 2.49 | | | 17.57 |
| 18 | −242.784 | 1.30 | 1.69680 | 55.5 | 17.78 |
| 19 | 38.739 | 3.86 | 1.80809 | 22.8 | 18.07 |
| 20 | −163.345 | 0.69 | | | 18.27 |
| 21 (flare-diaphragm) | ∞ | (variable) | | | 18.32 |
| 22 | 185.005 | 1.30 | 1.84666 | 23.8 | 18.99 |
| 23 | 24.017 | 6.06 | 1.49700 | 81.5 | 19.90 |
| | | | | | θgF = 0.537 |

-continued

UNIT mm

| | | | | |
|---|---|---|---|---|
| 24 | −59.008 | 0.15 | | 21.68 |
| 25 | 32.381 | 4.83 | 1.65160 58.5 | 24.28 |
| 26 | −109.790 | (variable) | | 24.41 |
| 27 | 3412.453 | 3.20 | 1.84666 23.8 | 24.31 |
| 28 | −43.990 | 0.39 | | 24.28 |
| 29 | −50.008 | 1.20 | 1.83481 42.7 | 23.92 |
| 30 | 26.054 | (variable) | | 23.58 |
| 31 | 58.436 | 6.00 | 1.58313 59.4 | 36.78 |
| 32* | −106.244 | 39.70 | | 37.09 |
| image plane | ∞ | | | |

Aspherical (lens) surface data

First surface

K = 0.00000e+000   A4 = 1.55731e−006   A6 = 6.23483e−011
A8 = −6.00103e−013   A10 = 6.22750e−016   A12 = −2.01210e−019

Thirty-second surface

K = 0.00000e+000   A4 = 7.30394e−007   A6 = −1.26882e−008
A8 = 7.09168e−011   A10 = −1.88617e−013   A12 = 1.93492e−016

Various data
Zoom ratio 2.75

| | Wide-angle | intermediate | telephoto |
|---|---|---|---|
| Focal length | 24.70 | 37.28 | 68.00 |
| F number | 3.59 | 3.79 | 4.12 |
| Half field angle (°) | 41.22 | 30.13 | 17.65 |
| Image height | 21.64 | 21.64 | 21.64 |
| Lens overall length | 199.71 | 180.50 | 163.71 |
| BF | 39.70 | 39.70 | 39.70 |
| d 6 | 57.94 | 27.94 | 0.36 |
| d14 | 1.30 | 4.97 | 16.15 |
| d21 | 17.80 | 15.10 | 4.88 |
| d26 | 2.78 | 5.58 | 12.68 |
| d30 | 6.98 | 14.00 | 16.73 |
| Incident pupil position | 31.72 | 28.39 | 29.52 |
| Exit pupil position | −95.73 | −132.04 | −104.52 |
| Front principal point | 51.92 | 57.58 | 65.45 |
| Rear principal point | 15.00 | 2.42 | −28.30 |

Zoom lens unit data

| unit | starting surface | focal length | lens configured length | front principal point | rear principal point |
|---|---|---|---|---|---|
| 1 | 1 | −39.88 | 23.39 | 4.98 | −12.79 |
| 2 | 7 | 33.13 | 14.84 | 5.57 | −2.94 |
| 3 | 15 | −47.66 | 11.85 | 1.29 | −7.90 |
| 4 | 22 | 39.24 | 12.35 | 6.83 | −0.80 |
| 5 | 27 | −34.72 | 4.79 | 3.14 | 0.34 |
| 6 | 31 | 65.53 | 6.00 | 1.36 | −2.48 |

Single lens data

| Lens | starting surface | focal length |
|---|---|---|
| 1 | 1 | −53.34 |
| 2 | 3 | −68.65 |
| 3 | 5 | 100.83 |
| 4 | 7 | −68.34 |
| 5 | 8 | −391.49 |
| 6 | 9 | 45.42 |
| 7 | 11 | 102.42 |
| 8 | 13 | 64.63 |
| 9 | 16 | −37.38 |
| 10 | 18 | −47.86 |
| 11 | 19 | 39.08 |
| 12 | 22 | −32.72 |
| 13 | 23 | 35.20 |
| 14 | 25 | 38.90 |
| 15 | 27 | 51.32 |
| 16 | 29 | −20.37 |
| 17 | 31 | 65.53 |

Numerical Example 4

UNIT mm

Surface data

| Surface Number | r | d | nd | vd | effective diameter |
|---|---|---|---|---|---|
| 1* | −559.121 | 3.50 | 1.58313 | 59.4 | 51.36 |
| 2 | 18.959 | (variable) | | | 33.30 |
| 3 | −130.418 | 1.30 | 1.77250 | 49.6 | 27.25 |
| 4 | 21.266 | 0.10 | 1.67271 | 16.7 | 23.84 |
| | | | | | θgFnNL = 0.755 |
| 5* | 16.383 | 2.72 | | | 23.21 |
| 6 | 21.165 | 5.22 | 1.84666 | 23.8 | 23.53 |
| | | | | | θgFpNL = 0.621 |
| 7 | 71.531 | (variable) | | | 22.30 |
| 8 | 66.634 | 1.25 | 1.83481 | 42.7 | 8.51 |
| 9 | 14.299 | 3.40 | 1.51742 | 52.4 | 8.55 |
| 10 | −274.364 | 1.54 | | | 8.99 |
| 11(diaphragm) | ∞ | 1.10 | | | 9.36 |
| 12 | 30.151 | 1.79 | 1.51823 | 58.9 | 9.71 |
| 13 | −34.255 | (variable) | | | 9.75 |
| 14 | −31.622 | 0.80 | 1.80400 | 46.6 | 11.87 |
| 15 | 42.866 | 0.94 | | | 12.64 |
| 16 | 35.291 | 2.54 | 1.84666 | 23.8 | 14.01 |
| 17 | −175.418 | (variable) | | | 14.58 |
| 18 | 21.047 | 5.58 | 1.49700 | 81.5 | 19.99 |
| | | | | | θgF = 0.537 |
| 19 | −62.672 | 1.00 | 1.83400 | 37.2 | 19.99 |
| 20 | 37.505 | 0.10 | | | 20.18 |
| 21 | 32.789 | 4.25 | 1.43875 | 94.9 | 20.40 |
| | | | | | θgF = 0.534 |
| 22 | −41.607 | 0.15 | | | 20.66 |
| 23 | 48.224 | 1.00 | 1.83400 | 37.2 | 20.83 |
| 24 | 15.535 | 7.16 | 1.48749 | 70.2 | 20.24 |
| | | | | | θgF = 0.530 |
| 25* | −33.616 | (variable) | | | 20.68 |
| image plan | ∞ | | | | |

Aspherical (lens) surface data

First surface

K = 0.00000e+000   A4 = 2.59761e−005   A6 = −5.07871e−008
A8 = 8.00740e−011   A10 = −6.98422e−014   A12 = 2.71642e−017

Fifth surface

K = 0.00000e+000   A4 = 1.04678e−005   A6 = −1.80510e−007
A8 = 3.73075e−010   A10 = 1.06910e−012   A12 = −1.17062e−014

Twenty-fifth surface

K = 0.00000e+000   A4 = 2.53754e−005   A6 = 1.08679e−007
A8 = −2.94830e−010   A10 = 2.78323e−012   A12 = 5.57681e−015

Various data
Zoom ratio 2.09

| | Wide-angle | intermediate | telephoto |
|---|---|---|---|
| Focal length | 10.21 | 15.66 | 21.30 |
| F number | 4.00 | 4.72 | 5.42 |
| Half field angle (°) | 53.23 | 41.10 | 32.67 |
| Image height | 13.66 | 13.66 | 13.66 |
| Lens overall length | 131.13 | 125.10 | 125.31 |
| BF | 34.80 | 43.11 | 51.43 |
| d 2 | 14.57 | 14.94 | 12.41 |
| d 7 | 23.63 | 8.92 | 3.34 |
| d13 | 1.24 | 6.94 | 10.97 |

-continued

| UNIT mm | | | |
|---|---|---|---|
| d17 | 11.45 | 5.75 | 1.71 |
| d25 | 34.80 | 43.11 | 51.43 |
| Incident pupil position | 18.44 | 17.01 | 15.34 |
| Exit pupil position | −77.64 | −73.34 | −67.48 |
| Front principal point | 27.72 | 30.57 | 32.83 |
| Rear principal point | 24.59 | 27.45 | 30.13 |

Zoom lens unit data

| unit | starting surface | focal length | lens configured length | front principal point | rear principal point |
|---|---|---|---|---|---|
| 1 | 1 | −31.38 | 3.50 | 2.13 | −0.07 |
| 2 | 3 | −50.45 | 9.34 | −1.81 | −8.24 |
| 3 | 8 | 39.03 | 9.07 | 7.35 | 0.81 |
| 4 | 14 | −71.83 | 4.28 | −2.75 | −5.70 |
| 5 | 18 | 36.81 | 19.24 | 6.02 | −8.42 |

Single lens data

| Lens | starting surface | focal length |
|---|---|---|
| 1 | 1 | −31.38 |
| 2 | 3 | −23.58 |
| 3 | 4 | −106.94 |
| 4 | 6 | 33.89 |
| 5 | 8 | −22.05 |
| 6 | 9 | 26.37 |
| 7 | 12 | 31.24 |
| 8 | 14 | −22.53 |
| 9 | 16 | 34.89 |
| 10 | 18 | 32.42 |
| 11 | 19 | −28.01 |
| 12 | 21 | 42.54 |
| 13 | 23 | −27.87 |
| 14 | 24 | 22.89 |

Numerical Example 5

| UNIT mm | | | | | |
|---|---|---|---|---|---|
| Surface data | | | | | |
| Surface Number | r | d | nd | vd | effective diameter |
| 1 | 55.284 | 2.20 | 1.83481 | 42.7 | 63.66 |
| 2 | 36.183 | 0.10 | 1.67271 | 16.7 | 55.93 |
| | | | $\theta gFnNL = 0.755$ | | |
| 3 | 31.927 | 9.96 | | | 53.77 |
| 4* | 74.154 | 3.50 | 1.53000 | 55.8 | 52.70 |
| 5 | 40.000 | 16.74 | | | 48.35 |
| 6 | −61.892 | 5.00 | 1.56907 | 71.3 | 46.06 |
| 7 | 86.644 | 8.27 | | | 45.71 |
| 8 | 76.994 | 9.11 | 1.72000 | 50.2 | 48.19 |
| | | | $\theta gFpNL = 0.552$ | | |
| 9 | −108.106 | 1.00 | | | 47.89 |
| 10 | 47.788 | 3.00 | 1.69350 | 53.2 | 42.87 |
| 11 | 36.647 | (variable) | | | 40.37 |
| 12 | 77.694 | 4.94 | 1.71300 | 53.9 | 39.83 |
| 13 | 122.709 | (variable) | | | 38.59 |
| 14 | 1375.861 | 5.00 | 1.84666 | 23.8 | 37.15 |
| 15 | −210.204 | 5.10 | | | 36.39 |
| 16 | −56.361 | 5.00 | 1.73800 | 32.3 | 34.79 |
| 17 | 85.513 | 0.15 | | | 34.81 |
| 18 | 77.048 | 5.18 | 1.67790 | 55.3 | 34.92 |
| 19 | −144.069 | 1.13 | | | 34.91 |
| 20 | 711.698 | 5.00 | 1.67790 | 54.9 | 34.50 |
| 21* | −65.049 | (variable) | | | 34.19 |
| 22(diaphragm) | ∞ | 11.37 | | | 24.29 |
| 23 | 44.257 | 6.52 | 1.76182 | 26.5 | 22.85 |
| 24 | −40.514 | 0.30 | | | 21.81 |
| 25 | −38.380 | 3.84 | 1.83400 | 37.2 | 21.52 |
| 26 | 30.139 | 22.90 | | | 21.77 |
| 27 | −326.658 | 11.26 | 1.49700 | 81.5 | 40.48 |
| | | | $\theta gF = 0.537$ | | |
| 28 | −29.620 | 1.64 | | | 42.36 |
| 29 | −35.248 | 2.81 | 1.80000 | 29.8 | 42.47 |
| 30 | −70.402 | 0.44 | | | 46.34 |
| 31 | 399.935 | 9.24 | 1.49700 | 81.5 | 49.44 |
| | | | $\theta gF = 0.537$ | | |
| 32 | −54.906 | 0.15 | | | 50.28 |
| 33 | 77.789 | 2.20 | 1.80000 | 29.8 | 50.55 |
| 34 | 39.914 | 9.85 | 1.56907 | 71.3 | 48.75 |
| | | | $\theta gF = 0.545$ | | |
| 35 | 569.583 | 6.20 | | | 48.51 |
| 36 | ∞ | 50.00 | 1.51633 | 64.1 | 60.00 |
| 37 | ∞ | 0.00 | | | 60.00 |
| 38 | ∞ | 36.00 | 1.69680 | 55.5 | 60.00 |
| 39 | ∞ | 1.73 | | | 60.00 |
| image plane | ∞ | | | | |

Aspherical (lens) surface data

Fourth surface

K = 2.10686e+000   A4 = 1.84233e−006   A6 = 1.05180e−009
A8 = −8.72578e−013   A10 = 1.46748e−015

Twenty-first surface

K = −5.16483e−001   A4 = 1.07258e−007   A6 = −2.77166e−010
A8 = 1.00316e−012   A10 = −1.13015e−015

Various data
Zoom ratio 1.35

| | Wide-angle | intermediate | telephoto |
|---|---|---|---|
| Focal length | 27.80 | 32.37 | 37.52 |
| F number | 3.09 | 3.09 | 3.09 |
| Half field angle (°) | 36.03 | 32.00 | 28.32 |
| Image height | 20.23 | 20.23 | 20.23 |
| Lens overall length | 314.93 | 314.93 | 314.93 |
| BF | 1.73 | 1.73 | 1.73 |
| d11 | 6.20 | 4.78 | 6.47 |
| d13 | 40.90 | 24.91 | 5.80 |
| d21 | 1.00 | 18.41 | 35.83 |
| Incident pupil position | 45.05 | 45.43 | 46.71 |
| Exit pupil position | −558.35 | −558.35 | −558.35 |
| Front principal point | 71.48 | 75.93 | 81.72 |
| Rear principal point | −26.07 | −30.64 | −35.79 |

Zoom lens unit data

| unit | starting surface | focal length | lens configured length | front principal point | rear principal point |
|---|---|---|---|---|---|
| 1 | 1 | −57.80 | 58.88 | 4.14 | −50.42 |
| 2 | 12 | 284.07 | 4.94 | −4.76 | −7.51 |
| 3 | 14 | 115.58 | 26.56 | 21.84 | 4.04 |
| 4 | 22 | 78.07 | 82.53 | 67.68 | 10.63 |
| G | 36 | ∞ | 86.00 | 27.10 | −27.10 |

Single lens data

| Lens | starting surface | focal length |
|---|---|---|
| 1 | 1 | −132.38 |
| 2 | 2 | −407.32 |
| 3 | 4 | −169.89 |
| 4 | 6 | −62.68 |
| 5 | 8 | 63.77 |
| 6 | 10 | −254.76 |

-continued

UNIT mm

| | | |
|---|---|---|
| 7 | 12 | 284.07 |
| 8 | 14 | 215.68 |
| 9 | 16 | −45.35 |
| 10 | 18 | 74.76 |
| 11 | 20 | 88.15 |
| 12 | 23 | 28.72 |
| 13 | 25 | −19.74 |
| 14 | 27 | 64.73 |
| 15 | 29 | −91.49 |
| 16 | 31 | 97.80 |
| 17 | 33 | −105.18 |
| 18 | 34 | 74.92 |
| 19 | 36 | 0.00 |
| 20 | 38 | 0.00 |

Numerical Example 6

UNIT mm

Surface data

| Surface Number | r | d | nd | vd | effective diameter |
|---|---|---|---|---|---|
| 1 | 61.836 | 2.20 | 1.80400 | 46.6 | 62.87 |
| 2 | 33.451 | 10.00 | | | 53.16 |
| 3* | 125.281 | 3.50 | 1.58313 | 59.4 | 52.48 |
| 4 | 47.259 | 11.55 | | | 47.75 |
| 5* | −69.970 | 0.10 | 1.61937 | 19.2 | 47.21 |
| | | | | | θgFnNL = 0.748 |
| 6 | −92.250 | 5.00 | 1.59282 | 68.6 | 47.15 |
| 7 | 111.538 | 8.30 | | | 46.52 |
| 8 | 102.731 | 7.67 | 1.76200 | 40.1 | 47.90 |
| | | | | | θgFpNL = 0.577 |
| 9 | −97.119 | 0.15 | | | 47.68 |
| 10 | 58.954 | 3.00 | 1.69680 | 55.5 | 43.03 |
| 11 | 42.312 | (variable) | | | 40.21 |
| 12 | 98.532 | 3.01 | 1.69680 | 55.5 | 38.80 |
| 13 | 210.563 | (variable) | | | 37.96 |
| 14 | −644.972 | 1.61 | 1.84666 | 23.8 | 34.63 |
| 15 | −369.084 | 5.10 | | | 34.38 |
| 16 | −56.889 | 5.00 | 1.73800 | 32.3 | 33.16 |
| 17 | 163.511 | 0.30 | | | 33.47 |
| 18 | 78.646 | 5.15 | 1.69680 | 55.5 | 33.75 |
| 19 | −111.890 | 1.20 | | | 33.64 |
| 20 | −1913.358 | 3.10 | 1.67790 | 54.9 | 32.90 |
| 21* | −67.715 | (variable) | | | 32.68 |
| 22 (diaphragm) | ∞ | 11.40 | | | 18.91 |
| 23 | 43.264 | 4.35 | 1.76182 | 26.5 | 17.75 |
| 24 | −42.628 | 0.50 | | | 17.43 |
| 25 | −37.861 | 3.80 | 1.83400 | 37.2 | 17.38 |
| 26 | 28.124 | 22.90 | | | 18.28 |
| 27 | −239.459 | 10.88 | 1.49700 | 81.5 | 39.14 |
| | | | | | θgF = 0.537 |
| 28 | −28.861 | 1.60 | | | 41.24 |
| 29 | −37.186 | 2.80 | 1.80610 | 33.3 | 41.79 |
| 30 | −58.402 | 0.50 | | | 44.88 |
| 31 | −1522.204 | 7.01 | 1.49700 | 81.5 | 47.34 |
| | | | | | θgF = 0.537 |
| 32 | −55.063 | 0.15 | | | 47.93 |
| 33 | 83.388 | 2.20 | 1.80000 | 29.8 | 48.41 |
| 34 | 37.583 | 10.39 | 1.59282 | 68.6 | 46.80 |
| | | | | | θgF = 0.545 |
| 35 | 1709.263 | 6.20 | | | 46.63 |
| 36 | ∞ | 50.00 | 1.51633 | 64.1 | 60.00 |
| 37 | ∞ | 0.00 | | | 60.00 |
| 38 | ∞ | 36.00 | 1.69680 | 55.5 | 60.00 |
| 39 | ∞ | 1.70 | | | 60.00 |
| image plane | ∞ | | | | |

Aspherical (lens) surface data

Third surface

K = 0.00000e+000   A4 = 2.40404e−006   A6 = 4.52688e−011
A8 = 3.06922e−013   A10 = 2.87080e−016

Fifth surface

K = 0.00000e+000   A4 = −2.69087e−007

Twenty-first surface

K = −1.28368e+000   A4 = 5.21342e−007   A6 = 2.92634e−009
A8 = −1.78291e−011   A10 = 3.32315e−014

Various data
Zoom ratio 1.38

| | Wide-angle | intermediate | telephoto |
|---|---|---|---|
| Focal length | 24.63 | 29.05 | 34.10 |
| F number | 3.60 | 3.60 | 3.60 |
| Half field angle (°) | 39.40 | 34.84 | 30.67 |
| Image height | 20.23 | 20.23 | 20.23 |
| Lens overall length | 296.42 | 296.42 | 296.42 |
| BF | 1.70 | 1.70 | 1.70 |
| d11 | 6.20 | 4.80 | 6.73 |
| d13 | 40.90 | 24.91 | 5.59 |
| d21 | 1.00 | 18.39 | 35.78 |
| Incident pupil position | 40.50 | 40.76 | 41.98 |
| Exit pupil position | −1055.44 | −1055.44 | −1055.44 |
| Front principal point | 64.55 | 69.02 | 74.98 |
| Rear principal point | −22.93 | −27.35 | −32.40 |

Zoom lens unit data

| unit | starting surface | focal length | lens configured length | front principal point | rear principal point |
|---|---|---|---|---|---|
| 1 | 1 | −52.73 | 51.47 | 3.36 | −43.76 |
| 2 | 12 | 262.87 | 3.01 | −1.55 | −3.30 |
| 3 | 14 | 106.15 | 21.45 | 20.67 | 6.49 |
| 4 | 22 | 69.19 | 78.48 | 64.76 | 15.96 |
| G | 36 | ∞ | 86.00 | 27.10 | −27.10 |

Single lens data

| Lens | starting surface | focal length |
|---|---|---|
| 1 | 1 | −93.88 |
| 2 | 3 | −132.32 |
| 3 | 5 | −468.56 |
| 4 | 6 | −84.40 |
| 5 | 8 | 66.62 |
| 6 | 10 | −232.32 |
| 7 | 12 | 262.87 |
| 8 | 14 | 1016.40 |
| 9 | 16 | −56.64 |
| 10 | 18 | 67.02 |
| 11 | 20 | 103.48 |
| 12 | 23 | 28.82 |
| 13 | 25 | −18.86 |
| 14 | 27 | 64.92 |
| 15 | 29 | −134.93 |

-continued

UNIT mm

| | | |
|---|---|---|
| 16 | 31 | 114.77 |
| 17 | 33 | −87.39 |
| 18 | 34 | 64.67 |
| 19 | 36 | 0.00 |
| 20 | 38 | 0.00 |

Numerical Example 7

UNIT mm

Surface data

| Surface Number | r | d | nd | vd | effective diameter |
|---|---|---|---|---|---|
| 1 | 103.239 | 1.05 | 1.69680 | 55.5 | 19.18 |
| 2 | 13.032 | 0.10 | 1.67271 | 16.7 | 16.43 |
| | | | | $\theta gFnNL = 0.755$ | |
| 3* | 10.686 | 3.10 | | | 16.00 |
| 4 | 14.676 | 2.10 | 1.80809 | 22.8 | 15.77 |
| | | | | $\theta gFpNL = 0.631$ | |
| 5 | 25.276 | (variable) | | | 15.18 |
| 6 | 13.575 | 2.40 | 1.69680 | 55.5 | 11.01 |
| 7 | −66.124 | 1.05 | | | 10.75 |
| 8 (diaphragm) | ∞ | 1.05 | | | 10.04 |
| 9 | −34.745 | 1.20 | 1.92286 | 18.9 | 9.64 |
| 10 | −10295.023 | 4.80 | | | 9.42 |
| 11 | −49.447 | 1.80 | 1.59201 | 67.0 | 8.22 |
| | | | | $\theta gF = 0.536$ | |
| 12* | −31.525 | (variable) | | | 9.01 |
| image plane | ∞ | | | | |

Aspherical (lens) surface data

Third surface $K = 0.00000e+000$  $A4 = -2.43089e-005$  $A6 = -3.93339e-007$
$A8 = 3.24890e-009$  $A10 = -6.97561e-011$ Twelfth surface $K = 0.00000e+000$  $A4 = 1.47371e-004$  $A6 = -1.81007e-006$
$A8 = 1.79631e-007$  $A10 = -3.43776e-009$ Various data
Zoom ratio 2.09

| | Wide-angle | intermediate | telephoto |
|---|---|---|---|
| Focal length | 22.10 | 34.22 | 46.19 |
| F number | 3.60 | 4.59 | 5.60 |
| Half field angle (°) | 31.72 | 21.76 | 16.48 |
| Image height | 13.66 | 13.66 | 13.66 |
| Lens overall length | 65.76 | 62.07 | 64.72 |
| BF | 28.16 | 36.68 | 45.09 |
| d 5 | 18.95 | 6.74 | 0.97 |
| d12 | 28.16 | 36.68 | 45.09 |
| Incident pupil position | 14.39 | 9.81 | 6.73 |
| Exit pupil position | −8.21 | −8.21 | −8.21 |
| Front principal point | 23.06 | 17.95 | 12.90 |
| Rear principal point | 6.06 | 2.46 | −1.09 |

Zoom lens unit data

| unit | starting surface | focal length | lens configured length | front principal point | rear principal point |
|---|---|---|---|---|---|
| 1 | 1 | −32.91 | 6.35 | −0.52 | −5.48 |
| 2 | 6 | 23.14 | 12.30 | 0.27 | −10.53 |

Single lens data

| Lens | starting surface | focal length |
|---|---|---|
| 1 | 1 | −21.51 |
| 2 | 2 | −89.75 |
| 3 | 4 | 39.78 |
| 4 | 6 | 16.37 |
| 5 | 9 | −37.78 |
| 6 | 11 | 141.63 |

TABLE 1

| | | LOWER LIMIT | UPPER LIMIT | NUMERICAL EXAMPLE | | | |
|---|---|---|---|---|---|---|---|
| | | | | 1 | 2 | 3 | 4 |
| CONDITIONAL EXPRESSION | (1) | 0.0 | 0.4 | 0.179 | 0.079 | 0.179 | 0.076 |
| | (2) | 6.5E−04 | 5.0E−03 | 1.25E−03 | 7.71E−04 | 1.69E−03 | 3.78E−03 |
| | (3) | — | 40.0 | 7.70 | 0.27 | 27.65 | 7.04 |
| | (4) | 1.0 | 10.0 | 4.68 | 2.41 | 3.82 | 3.16 |
| | (5) | 60.0 | 100.0 | 81.54 | 81.54 | 81.54 | 94.95 |
| | (6) | 0.000 | 0.100 | 0.0308 | 0.0308 | 0.0308 | 0.0502 |
| | (7) | 1.0 | 6.0 | 1.307 | 1.501 | 1.341 | 4.946 |

| | | LOWER LIMIT | UPPER LIMIT | NUMERICAL EXAMPLE | | |
|---|---|---|---|---|---|---|
| | | | | 5 | 6 | 7 |
| CONDITIONAL EXPRESSION | (1) | 0.0 | 0.4 | 0.076 | 0.079 | 0.076 |
| | (2) | 6.5E−04 | 5.0E−03 | 1.72E−03 | 1.06E−03 | 2.72E−03 |
| | (3) | — | 40.0 | 33.49 | 20.93 | 6.02 |
| | (4) | 1.0 | 10.0 | 6.39 | 7.03 | 2.26 |
| | (5) | 60.0 | 100.0 | 71.31 | 68.69 | 67.05 |

TABLE 1-continued

| | | | | | |
|---|---|---|---|---|---|
| (6) | 0.000 | 0.100 | 0.0213 | 0.0164 | 0.0046 |
| (7) | 1.0 | 6.0 | 2.079 | 2.141 | 1.489 |

TABLE 2

| | NUMERICAL EXAMPLE | | | |
|---|---|---|---|---|
| | 1 | 2 | 3 | 4 |
| nd | 1.61932 | 1.61937 | 1.61932 | 1.67271 |
| ng | 1.68569 | 1.66709 | 1.68569 | 1.73258 |
| nC | 1.60901 | 1.61062 | 1.60901 | 1.66206 |
| nF | 1.65014 | 1.64293 | 1.65014 | 1.70225 |
| vd | 15.06 | 19.17 | 15.06 | 16.74 |
| θgF | 0.864 | 0.748 | 0.864 | 0.755 |

| | NUMERICAL EXAMPLE | | |
|---|---|---|---|
| | 5 | 6 | 7 |
| nd | 1.67271 | 1.61937 | 1.67271 |
| ng | 1.73258 | 1.66709 | 1.73258 |
| nC | 1.66206 | 1.61062 | 1.66206 |
| nF | 1.70225 | 1.64293 | 1.70225 |
| vd | 16.74 | 19.17 | 16.74 |
| θgF | 0.755 | 0.748 | 0.755 |

The zoom lens of each of the above embodiments may be used for both a projection optical system of a projector, and an image-pickup system of an image-pickup apparatus.

A description will now be given of an embodiment of an image-pickup apparatus (a camera system) (an optical equipment) to which the zoom lens of the present invention is applied. In FIG. 15, reference numeral 10 denotes an image-pickup lens including the zoom lens of one of the first to fourth and seventh embodiments. The zoom lens 1 is held by a lens barrel 2 that serves as a holding member. Reference numeral 20 denotes a camera body. The camera body 20 includes a quick return mirror 3 configured to reflect a light flux from the image-pickup lens 10 upwardly, a focus plate 4 disposed at a position where an image of the image-pickup lens 10 is formed, a penta dach prism 5 configured to convert an inverted image formed on the focus plate 4 into an erected image, and an eye piece 6 used to observe the erected image.

Reference numeral 7 denotes a photosensitive surface, where a solid-state image-pickup element (a photoelectric conversion element) configured to receive an image of a CCD sensor, a CMOS sensor, and the like, or a film is disposed. In photographing, the quick return mirror 3 is evacuated from the optical path, and an image is formed by the image-pickup lens 10 on the photosensitive surface 7.

A description will now be given of an embodiment of a projection apparatus (a projector) to which the zoom lens of the present invention is applied. FIG. 16 illustrates an image projection apparatus in which the zoom lens according to the fifth or sixth embodiments of the present invention is applied to a three-plate-type color liquid crystal projector. Image information of a plurality of colored beams based on a plurality of liquid crystal display devices are combined by a color combiner. Thereby, a projection lens magnifies and projects the image on a screen surface.

In FIG. 16, a color liquid crystal projector 100 includes three panels of R (red), G (green), and B (blue), a prism 200 as a color combiner configured to combine RGB colored beams from the R, G, and B panels into one optical path, and a projection lens 300 including the above zoom lens configured to project the combined light onto the screen 400. When the zoom lens of one of the numerical examples 1 to 7 is applied to a digital camera, a projector, and the like, an image-pickup apparatus and a projection apparatus exhibits a high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-207970, filed Sep. 21, 2012 which is hereby incorporated by reference herein in its entirety.

What is claimed is:

1. A zoom lens comprising, in order from an object side to an image side, a first lens unit having a negative refractive power, a rear unit including one or more lens units, a distance between every adjacent lens units varies during zooming, and an aperture diaphragm disposed on the image side of the first lens unit, a combined focal length of the rear unit at a wide-angle end being positive,
wherein one lens unit LG on the object side of the aperture diaphragm includes an optical element GnNL made of a solid material having a negative refractive power and another optical element made of a solid material having a positive refractive power, and
wherein the following conditional expressions are satisfied:

$$0.0 < \theta gFnNL - (-1.7 \times 10^{-2} \times vdnNL^3 + 5.3 \times 10^{-5} \times vdnNL^2 - 5.7 \times 10^{-3} \times vdnNL + 0.76) < 0.4; \text{ and}$$

$$6.5 \times 10^{-4} < ((\theta gFnNL - \theta gFpNL)/vdnNL) \times |fG/fnNL| < 5.0 \times 10^{-3},$$

where vdnNL is an Abbe number of a material of the optical element GnNL, θgFnNL is a partial dispersion ratio of the material of the optical element GnNL, θgFpNL is a partial dispersion ratio of a material of an optical element GpNL having a positive refractive power, the material of the optical element GpNL has a maximum partial dispersion ratio among materials of positive lenses included in the lens unit LG, fnNL is a focal length of the optical element GnNL in air, and fG is a focal length of the lens unit LG.

2. The zoom lens according to claim 1, wherein the following conditional expression is satisfied:

$$|vdnNL - vdpNL| < 40$$

where vdpNL is an Abbe number of the material of the optical element GpNL.

3. The zoom lens according to claim 1, wherein the following conditional expression is satisfied:

$$1.0 < |fnNL|/fpNL < 10.0$$

where fpNL is a focal length of the optical element GpNL in air.

4. The zoom lens according to claim 1, further comprising at least one optical element Gpr having a positive refractive power on the image side of the aperture diaphragm, wherein the following conditional expressions are satisfied:

$$60 < vdprNL < 100; \text{ and}$$

$$0.005 < \theta gFprNL - (-1.6 \times 10^{-3} \times vdprNL + 0.64) < 0.100,$$

where vdprNL is an Abbe number of a material of the optical element Gpr and θgFprNL is a partial dispersion ratio of the material of the optical element Gpr.

5. The zoom lens according to claim 1, wherein the following conditional expression is satisfied:

$$1.0 < |f1|/fw < 7.0$$

where f1 is a focal length of the first lens unit, and fw is a focal length of an entire system at the wide-angle end.

6. The zoom lens according to claim 1, wherein the optical element GnNL is cemented with a negative lens.

7. The zoom lens according to claim 1, wherein an interface surface of the optical element GnNL with air has an aspherical shape.

8. The zoom lens according to claim 1, wherein the rear unit includes, in order from the object side to the image side, a second lens unit having a positive refractive power, a third lens unit having a negative refractive power, and a fourth lens unit having a positive refractive power.

9. The zoom lens according to claim 1, wherein the rear unit includes, in order from the object side to the image side, a second lens unit having a positive refractive power, a third lens unit having a negative refractive power, a fourth lens unit having a positive refractive power, a fifth lens unit having a negative refractive power, and a sixth lens unit having a positive refractive power.

10. The zoom lens according to claim 1, wherein the rear unit includes, in order from the object side to the image side, a second lens unit having a negative refractive power, a third lens unit having a positive refractive power, a fourth lens unit having a negative refractive power, and a fifth lens unit having a positive refractive power.

11. The zoom lens of claim 1, wherein the rear unit includes, in order from the object side to the image side, a second lens unit having a positive refractive power, a third lens unit having a positive refractive power, and a fourth lens unit having a positive refractive power.

12. The zoom lens of claim 1, wherein the rear unit includes a second lens unit having a positive refractive power.

13. The zoom lens according to claim 1, wherein the lens unit LG has a negative refractive power.

14. The zoom lens according to claim 13, wherein the lens unit LG is the first lens unit closest to the object.

15. The zoom lens according to claim 14, wherein the optical element GnNL is cemented with a negative lens closest to the object.

16. An image-pickup apparatus comprising a zoom lens, and a photoelectric conversion element configured to receive an image formed by the zoom lens, wherein the zoom lens includes, in order from an object side to an image side, a first lens unit having a negative refractive power, a rear unit including one or more lens units, a distance between every adjacent lens units varies during zooming, and an aperture diaphragm disposed on the image side of the first lens unit, a combined focal length of the rear unit at a wide-angle end being positive, wherein one lens unit LG on the object side of the aperture diaphragm includes an optical element GnNL made of a solid material having a negative refractive power and another optical element made of a solid material having a positive refractive power, and wherein the following conditional expressions are satisfied:

$$0.0 < \theta gFnNL - (-1.7 \times 10^{-7} \times vdnNL^3 + 5.3 \times 10^{-5} \times vdnNL^2 - 5.7 \times 10^{-3} \times vdnNL + 0.76) < 0.4;\ \text{and}$$

$$6.5 \times 10^{-4} < |(\theta gFnNL - \theta gFpNL)/vdnNL) \times |fG/fnNL| < 5.0 \times 10^{-3},$$

where vdnNL is an Abbe number of a material of the optical element GnNL, θgFnNL is a partial dispersion ratio of the material of the optical element GnNL, θgFpNL is a partial dispersion ratio of a material of an optical element GpNL having a positive refractive power, the material of the optical element GpNL has a maximum partial dispersion ratio among materials of positive lenses included in the lens unit LG, fnNL is a focal length of the optical element GnNL in air, and fG is a focal length of the lens unit LG.

17. An image projection apparatus, comprising a zoom lens, and an image display device configured to form an original image, the image projection apparatus projecting the original image formed by the image display device by the zoom lens, wherein the zoom lens includes, in order from an front side to an rear side, a first lens unit having a negative refractive power, a rear unit including one or more lens units, a distance between every adjacent lens units varies during zooming, and an aperture diaphragm disposed on the rear side of the first lens unit, a combined focal length of the rear unit at a wide-angle end being positive, wherein one lens unit LG on the front side of the aperture diaphragm includes an optical element GnNL made of a solid material having a negative refractive power and another optical element made of a solid material having a positive refractive power, and wherein the following conditional expressions are satisfied:

$$0.0 < \theta gFnNL - (-1.7 \times 10^{-7} \times vdnNL^3 + 5.3 \times 10^{-5} \times vdnNL^2 - 5.7 \times 10^{-3} \times vdnNL + 0.76) < 0.4;\ \text{and}$$

$$6.5 \times 10^{-4} < |(\theta gFnNL - \theta gFpNL)/vdnNL) \times |fG/fnNL| < 5.0 \times 10^{-3},$$

where vdnNL is an Abbe number of a material of the optical element GnNL, θgFnNL is a partial dispersion ratio of the material of the optical element GnNL, θgFpNL is a partial dispersion ratio of a material of an optical element GpNL having a positive refractive power, the material of the optical element GpNL has a maximum partial dispersion ratio among materials of positive lenses included in the lens unit LG, fnNL is a focal length of the optical element GnNL in air, and fG is a focal length of the lens unit LG.

* * * * *